(12) United States Patent
Kaeli et al.

(10) Patent No.: US 11,325,685 B2
(45) Date of Patent: *May 10, 2022

(54) PASSIVE BALLAST DEVICE, SYSTEM AND METHODS OF USING SAME

(71) Applicant: Woods Hole Oceanographic Institution, Woods HOle, MA (US)

(72) Inventors: Jeffrey Kaeli, Woods Hole, MA (US); Robin Littlefield, Falmouth, MA (US)

(73) Assignee: WOODS HOLE OCEANOGRAPHIC INSTITUTION, Woods Hole, MA (US)

( * ) Notice: Subject to any disclaimer, the term of this patent is extended or adjusted under 35 U.S.C. 154(b) by 92 days.

This patent is subject to a terminal disclaimer.

(21) Appl. No.: 16/812,834

(22) Filed: Mar. 9, 2020

(65) Prior Publication Data

US 2021/0276679 A1    Sep. 9, 2021

Related U.S. Application Data

(63) Continuation-in-part of application No. 16/162,191, filed on Oct. 16, 2018, now Pat. No. 10,640,188.
(Continued)

(51) Int. Cl.
*B63G 8/24* (2006.01)
*B63G 8/39* (2006.01)
(Continued)

(52) U.S. Cl.
CPC ............ *B63G 8/24* (2013.01); *B63G 8/39* (2013.01); *G05D 1/0016* (2013.01);
(Continued)

(58) Field of Classification Search
CPC . B63G 8/00; B63G 8/001; B63G 8/22; B63G 8/24; B63G 2008/00;
(Continued)

(56) References Cited

U.S. PATENT DOCUMENTS 3,204,596 A * 9/1965 Fallon .................... B63C 11/46
114/315
4,121,529 A * 10/1978 Smith .................... F16L 1/163
405/171

(Continued)

*Primary Examiner* — Daniel V Venne
(74) *Attorney, Agent, or Firm* — Douglas Denninger

(57) ABSTRACT

A passive ballast device, system and method of using same, configured for use with a submersible vehicle in a liquid environment, including a chamber having at least one rigid wall to define at least a portion of a chamber volume, and a passively movable compensator having at least first and second surfaces, the first surface configured to be exposed to the liquid environment, the second surface excluded from the liquid environment, and forming, together with the at least one wall of the chamber, a fluid-tight seal to establish the remainder of the chamber volume, to exclude the liquid environment from the chamber volume and configured to adjust the chamber volume to at least a first chamber volume and a second chamber volume. The chamber volume is configured to establish at least a first buoyancy and second buoyancy, the compensator is configured to respond to a change in environmental pressure within the liquid environment, and the compensator is passively moved by the change in environmental pressure to change the first chamber volume to the second chamber volume, thereby changing from the first buoyancy to the second buoyancy.

15 Claims, 15 Drawing Sheets

Related U.S. Application Data

(60) Provisional application No. 62/722,688, filed on Aug. 24, 2018, provisional application No. 62/572,808, filed on Oct. 16, 2017.

(51) Int. Cl.
*G05D 1/00* (2006.01)
*G05D 1/04* (2006.01)
*B63G 8/00* (2006.01)

(52) U.S. Cl.
CPC ............ *G05D 1/0022* (2013.01); *G05D 1/048* (2013.01); *B63G 2008/005* (2013.01)

(58) Field of Classification Search
CPC ........ B63G 2008/001; B63G 2008/002; B63G 2008/004; G05D 1/0016; G05D 1/0022; G05D 1/048
USPC .......................... 114/312, 313, 330, 331, 333
See application file for complete search history.

(56) References Cited

U.S. PATENT DOCUMENTS

| | | | | |
|---|---|---|---|---|
| 4,364,325 | A * | 12/1982 | Bowditch | B63B 22/18 114/124 |
| 5,947,051 | A * | 9/1999 | Geiger | B62D 57/00 114/313 |
| 9,272,756 | B1 * | 3/2016 | Thomson | B63B 22/18 |
| 9,321,515 | B2 * | 4/2016 | Edwards | B63C 7/10 |
| 10,106,233 | B2 * | 10/2018 | Lichter | B63G 8/001 |
| 10,112,686 | B2 * | 10/2018 | Austin | B63B 22/003 |
| 10,144,493 | B2 * | 12/2018 | Edwards | B63G 8/24 |
| 10,196,117 | B2 * | 2/2019 | Lichter | B63G 8/16 |
| 2013/0228117 | A1 * | 9/2013 | Edwards | B63G 8/14 114/331 |
| 2016/0229502 | A1 * | 8/2016 | Edwards | B63B 17/00 |
| 2017/0081002 | A1 * | 3/2017 | Lichter | B63G 8/08 |
| 2017/0081004 | A1 * | 3/2017 | Lichter | B63G 8/16 |
| 2017/0081005 | A1 * | 3/2017 | Lichter | B63G 8/08 |
| 2018/0346082 | A1 * | 12/2018 | Smith | G05D 1/048 |
| 2019/0100292 | A1 * | 4/2019 | Austin | B63G 8/33 |

* cited by examiner

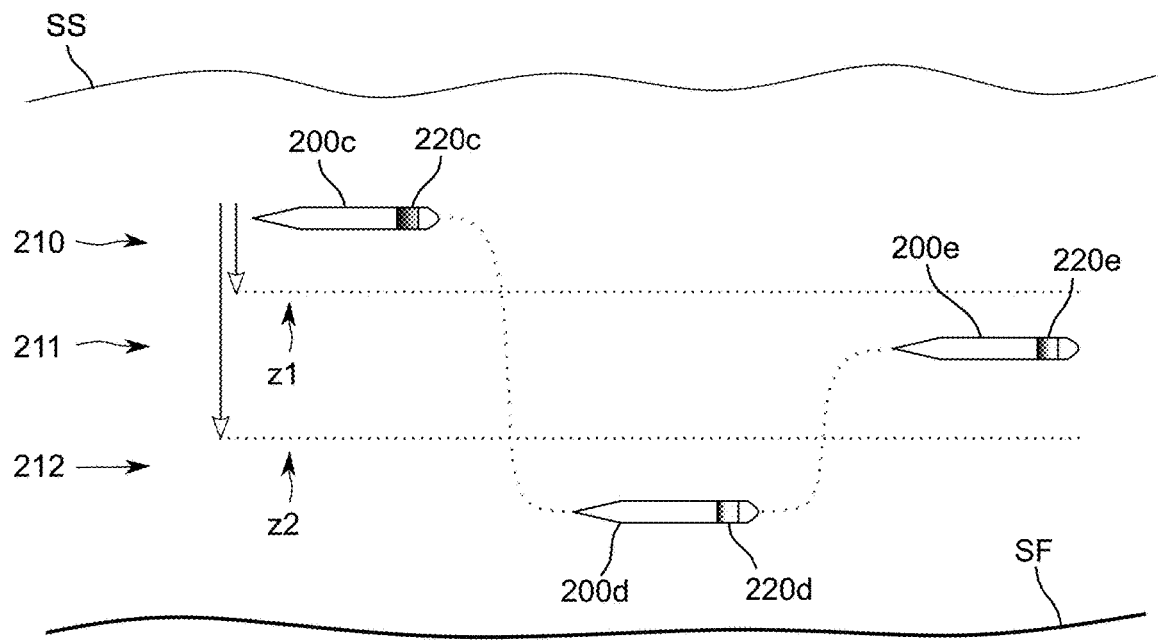
FIG. 2A
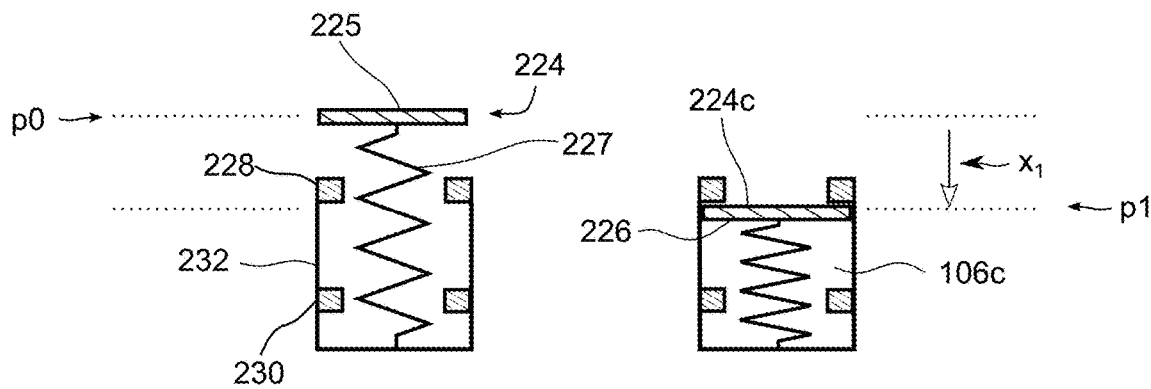
FIG. 2B  FIG. 2C
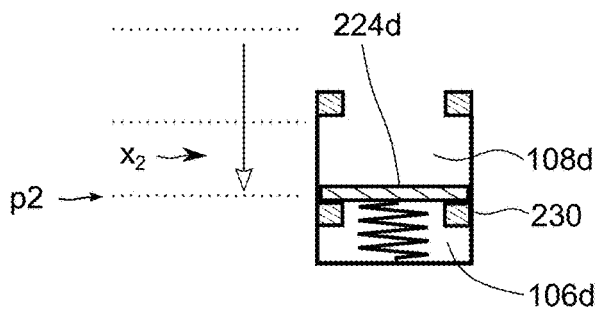 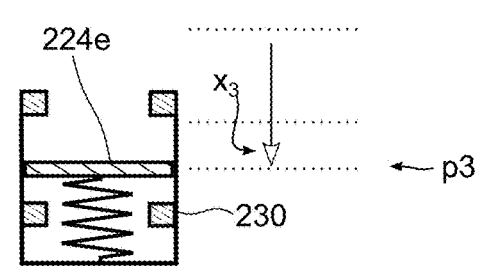
FIG. 2D  FIG. 2E

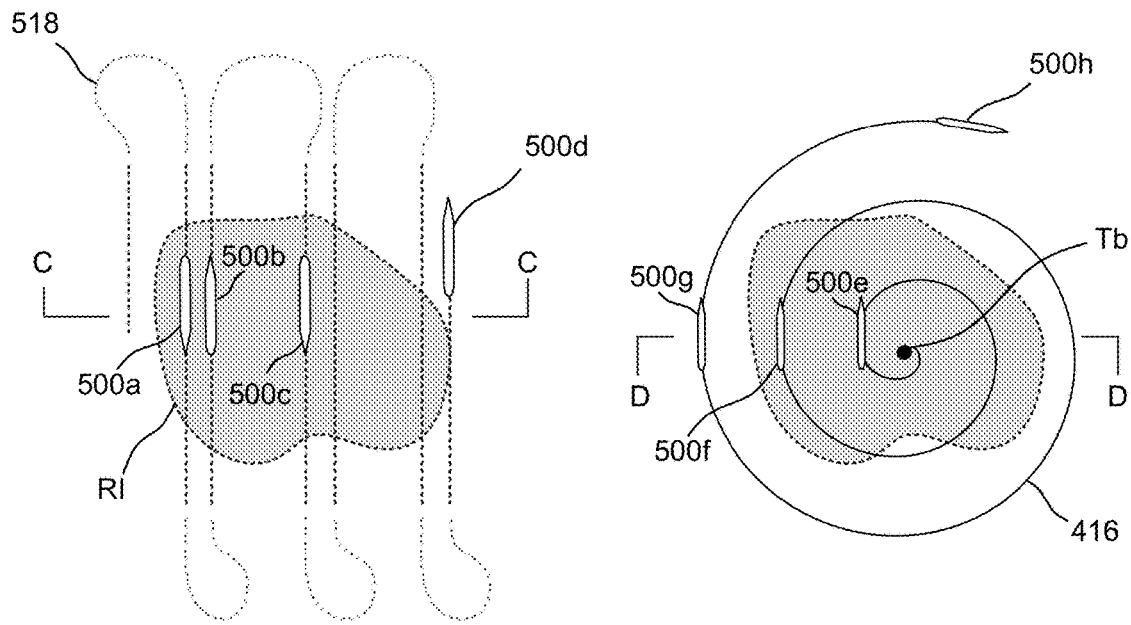
PRIOR ART
FIG. 5A
FIG. 5B
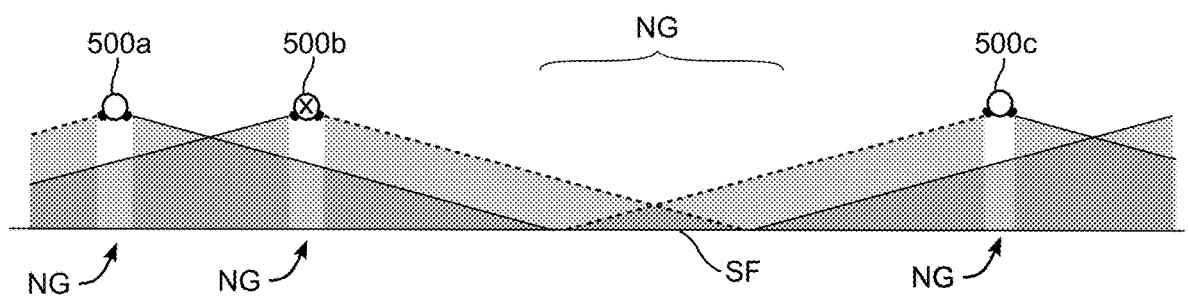
PRIOR ART
FIG. 5C
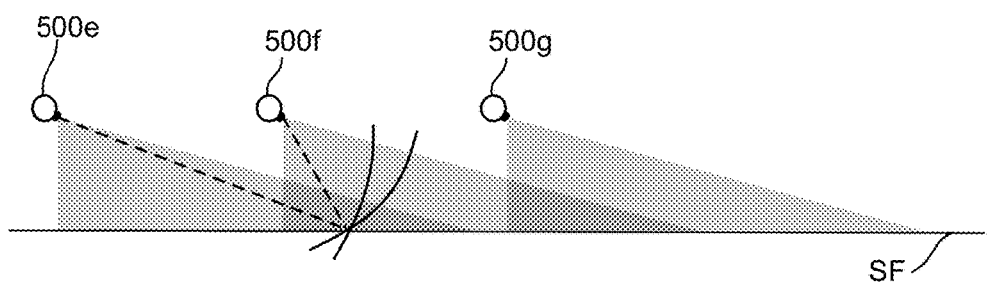
FIG. 5D

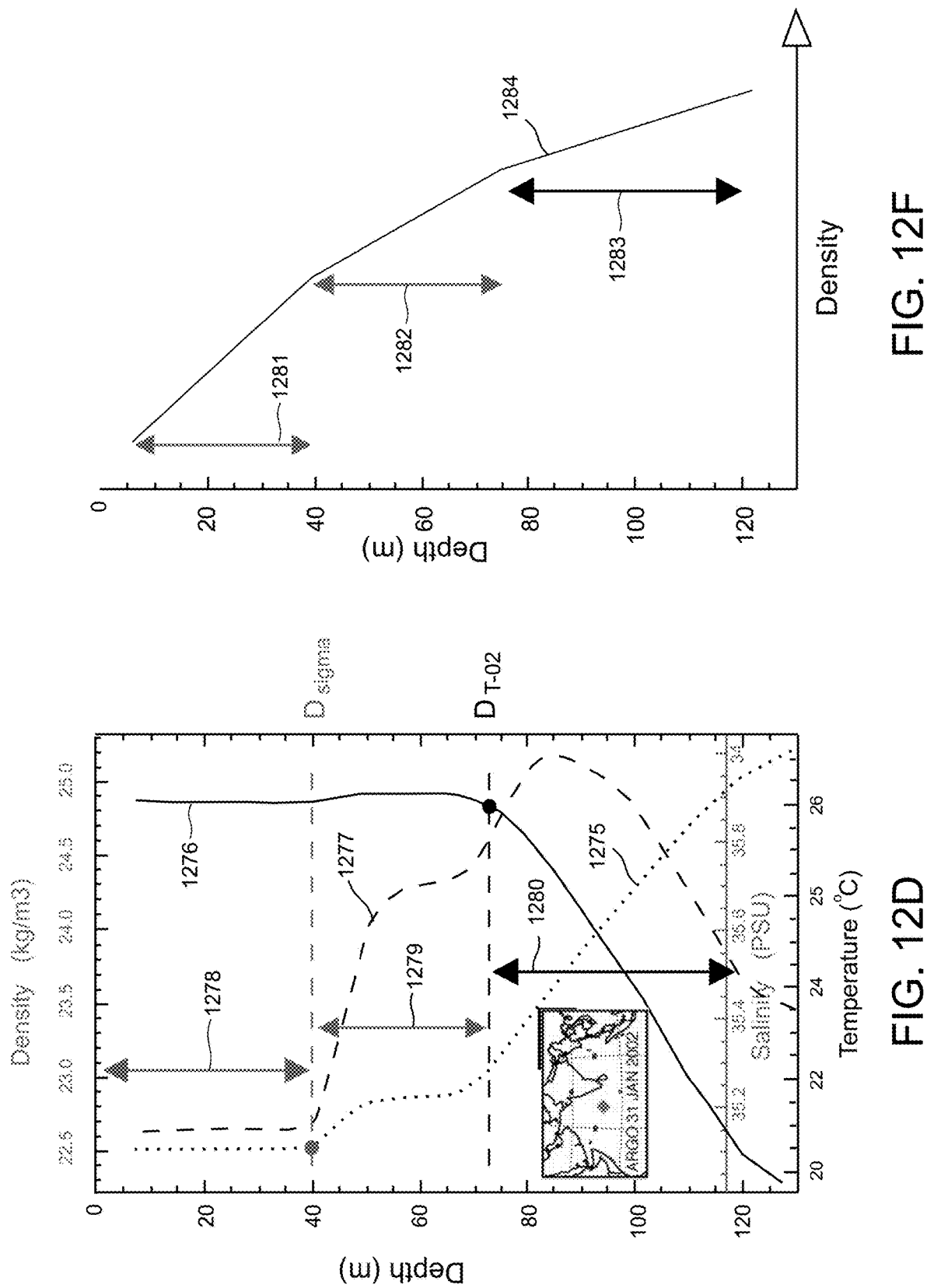

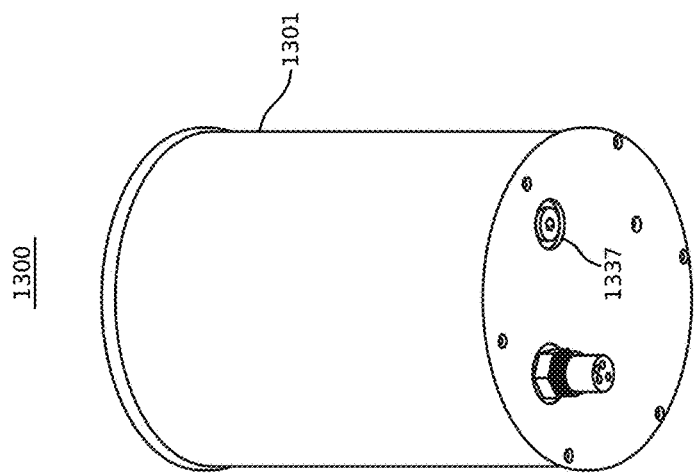
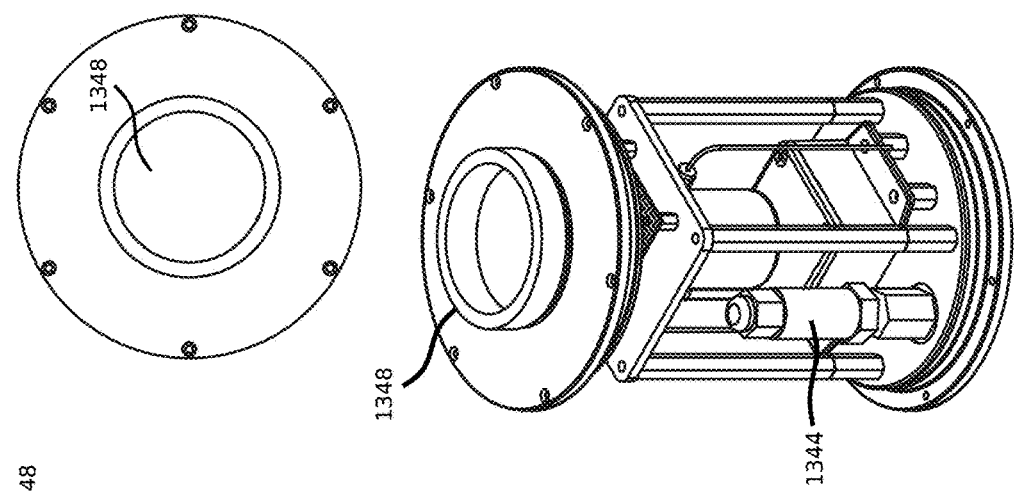
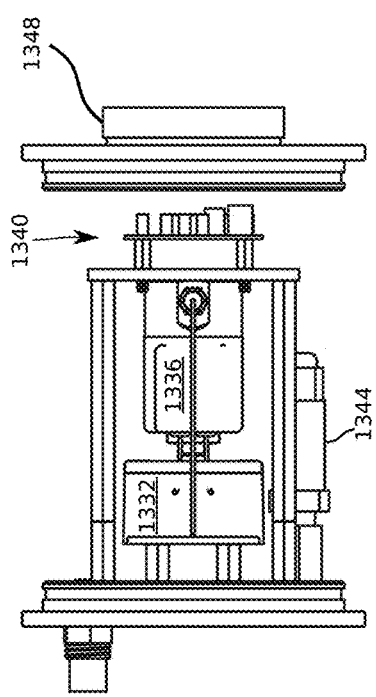
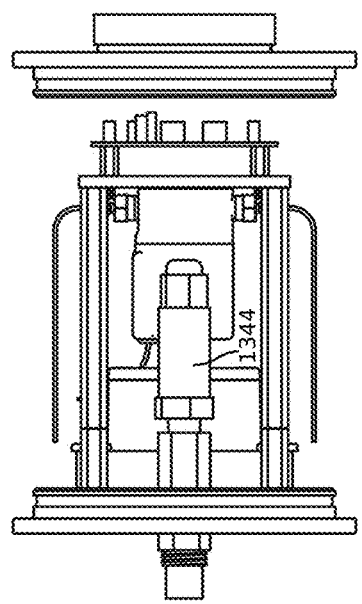
FIG. 13E
FIG. 13C
FIG. 13D
FIG. 13A
FIG. 13B

PASSIVE BALLAST DEVICE, SYSTEM AND METHODS OF USING SAME

CROSS-REFERENCE TO RELATED APPLICATION

This application claims priority to U.S. application Ser. No. 16/572,808 filed on 16 Oct. 2018, which claims priority to U.S. Provisional Application Nos. 62/572,808 filed 16 Oct. 2017 and 62/722,688 filed 24 Aug. 2018. The entire contents of each of the above-mentioned applications are incorporated here by reference.

FIELD OF THE INVENTION

This invention relates to ballasting systems for submergible vehicles and, more particularly, to passively-adjustable ballast and depth control systems for stationary or in-motion submerged vehicles within a liquid body.

BACKGROUND OF THE INVENTION

Autonomous underwater vehicles (AUVs) are inherently energy-limited because they must carry their own batteries or other power source. They are also typically ballasted to be positively buoyant. While positive buoyancy is convenient for floating on the surface and obtaining a GPS fix, or as a fail-safe in the event of a system failure, positive buoyance requires an AUV to expend more energy during a dive, or to maintain a constant depth. AUVs typically are pitched downward in order to descend to a desired depth. While pitched, the body of the vehicle acts like an upside-down airplane wing, providing downward "lift" at the expense of increased drag. This drag must be overcome with additional propulsive force, which in turn requires more power, reducing the length of a mission the AUV can perform before the batteries are depleted. A neutrally buoyant AUV with the same battery capacity and components would have an extended mission length as opposed to a positively buoyant AUV.

One current solution to the positive-buoyancy problem is to incorporate active ballast systems into platforms specially designed for long endurance missions for maximum propulsion efficiency. However, active ballast systems are costly in both power consumption and additional weight and space incorporated into the vehicle. Therefore, they are not widely used in AUVs, especially not in smaller vehicles. Active ballast systems often include tanks or other reservoirs connected with pumps or pistons used to drive fluid into and out of a reservoir internal of the vehicle, changing vehicle's displaced fluid volume and therefore buoyancy. Active ballast systems require additional control and electrical power, increasing the demands the ballast system puts on the vehicle. In large vehicles, such as full-sized submarines and surface ships, an active ballast system does not present a significant demand in terms of overall space, power consumption or complexity. However, in small submerged vehicles, especially small AUVs, an active ballast system will significantly impact component complexity and mission duration.

The need for proper ballasting and pitch optimization is exemplified in simpler vehicles having fewer appendages contributing to the overall drag. The appendage drag for one such vehicle, the Remote Environmental Monitoring UnitS (REMUS) AUV, with its various antennas and transducers, might be responsible for 75% or more of the total drag, translating to around 3-4% additional drag per degree of pitch due to the change in projected frontal area as pitch is increased. However, for a simple streamlined body, as might be expected from a small, low-power consuming, low-cost AUV, form drag can be upwards of 15% additional drag per degree of pitch. Pitch and positive buoyancy is discussed in more detail in Palmer et al. 2009 (Trans RINA, Vol 151, Part A3, International Journal of Maritime Engineering, July-September 2009), incorporated by reference herein. Additionally, if the vehicle is ballasted to be neutrally buoyant, the energy savings from level flight (or flight with smaller pitch angles) could extend the duration a typical mission by nearly 50%. Furthermore, once neutrally buoyant, an AUV can go into a low-power drifting sleep mode, waking up periodically to communicate or take measurements, extending its endurance many times over. The current trends towards lower-power processors and sensors and the desire for longer AUV missions necessitate slower speeds and moreover some form of ballast system to unlock the full potential of these platforms.

In AUV design and operation, regardless of vehicle size, there is always a trade-off between speed and endurance. Slower speeds equate to longer missions because drag is proportional to the square of the velocity. When the power loads of various payload sensors are taken into consideration, an optimal speed emerges that corresponds to a maximum theoretical range. However, the pitch angles required to counteract positive buoyancy complicate this analysis because they contribute an additional drag term that is inversely proportional to speed. At higher speeds, this term is minimized because smaller pitch angles are required to balance the buoyant force. At lower speeds, however, the lift must be balanced using higher pitch angles, which effectively increases the cross-sectional area of the vehicle and subsequently the drag.

One solution to construct long-duration autonomous vehicles, are autonomous underwater gliders (AUGs). AUGs most often forgo a typical propeller propulsion system and instead use a pump to repeatedly change buoyancy, creating a propulsive force (termed a buoyancy engine). While AUGs use ambient pressure to their advantage, they do so for propulsion, and not as a driver of buoyancy change without an active, pumping component.

Another use of buoyancy for underwater craft is described in U.S. Pat. No. 3,204,596 by Fallon. Fallon's Hydroglider relates to a propellerless submarine that has a pressurizable compartment with one or more collapsible bags, each filled with a gas. The Hydroglider fits a single diver, and that person controls a pump to move ambient water into and out of the pressurized bags. The movement of the ambient water (and therefore a density and buoyancy change) acts much like modern AUGs, producing a forward motion. In addition to the human-powered glider, Fallon describes a buoyancy controlling mechanism of two pods, one above and one below the Hydroglider. The diver operates a bellows to drive ambient water into the pod below the craft, reducing the crafts buoyancy. The bellows allows the diver to over pressurize the lower pod, and give the craft lift by releasing the pressurized water. The upper pod can be connected to the lower pod and provides a stabilizing effect with no net change in buoyancy. Such a system fails to provide a truly passive (i.e. not diver activated) system that provides a changing vehicle buoyancy by means of the ambient water pressure.

A buoy containing a variable buoyancy portion without any rigid structure, such as a compressible bladder or compressible foam which changes shape to alter buoyancy, is disclosed in U.S. Pat. No. 9,272,756 by Thomson et al.

Therefore, alternative systems are needed to achieve neutral buoyancy, allowing operation at smaller pitch angles, without adding complexity or drag to the vehicle.

SUMMARY OF THE INVENTION

An object of the present invention is to provide an improved ballast system for stationary or mobile submerged vehicles which reduces vehicle size, complexity and power consumption.

Another object of the present invention is to increase autonomy of such vehicles.

A still further object of the present invention is to enable enhanced techniques for surveying and/or inspecting underwater regions of interest.

Yet another object of the present invention is to facilitate low-power hovering and efficient maneuvering, and to extend vehicle range within a liquid body.

This invention features a passive ballast device and system, submersible vehicles such as AUVs including same, and methods of using such systems and vehicles in a liquid environment. The passive ballast device includes a chamber having at least one rigid wall to define at least a portion of a chamber volume, and a passively movable compensator having at least first and second surfaces, the first surface configured to be exposed to the liquid environment, the second surface excluded from the liquid environment, and forming, together with the at least one wall of the chamber, a fluid-tight seal to establish the remainder of the chamber volume, to exclude the liquid environment from the chamber volume and configured to adjust the chamber volume to at least a first chamber volume and a second chamber volume. The chamber volume is configured to establish at least a first buoyancy and second buoyancy, the compensator is configured to respond to a change in environmental pressure within the liquid environment, and the compensator is passively moved by the change in environmental pressure to change the first chamber volume to the second chamber volume, thereby changing from the first buoyancy to the second buoyancy.

In some embodiments, the chamber and the compensator are carried within a housing that is configured to be exposed to the liquid environment. In a number of embodiments, the passive ballast device lacks a mechanism external to the chamber to apply a non-environmental force to the compensator. In certain embodiments, the compensator is constructed to change the size of the chamber volume, during an adaptive state, until the chamber pressure is equal to the environmental pressure. In some embodiments, the device further includes at least one retaining mechanism located within the chamber volume, wherein the compensator is configured to be constrained between a first compensator position and a second compensator position by the retaining mechanism.

In some embodiments, the device and the submersible vehicle have a positive buoyancy force at a first depth in the liquid environment, and the device and the submersible vehicle have a neutral buoyancy force at a second depth in the liquid environment. In one embodiment, at least the first chamber volume is at a negative pressure, that is, the chamber volume is placed at at least partial vacuum. In other embodiments, the chamber volume is filled with a buoyancy fluid such as a gas or a liquid. In certain embodiments, the compensator experiences tension that increases during increased environmental pressure and provides a resistive tensile force during increased environmental pressure. In other embodiments, the compensator experiences compression that increases during increased environmental pressure, and the device includes a biasing member to provide a preselected biasing force during compression.

In some embodiments, the device further includes a controllable opening having at least a first state and a second state, attached to the housing and forming a second space between the compensator and the controllable opening, and a controller. The controllable opening separates the compensator and the second volume from the liquid environment when placed in the second state, the first state provides at least a partial opening between the liquid environment and second space, and the second state provides a fluid-tight seal between the liquid environment and second space, The controller is configured to change between the at least first and second states of the controllable opening. In one embodiment, the device and the submersible vehicle have a positive buoyancy force at a first depth in the liquid environment, the device and submersible vehicle have a neutral buoyancy force at a second depth in the liquid environment, wherein the controller changes between the first and second states of the controllable opening at the second depth, and wherein the device and submersible vehicle maintain a neutral buoyancy at a third depth in the liquid environment. In certain embodiments, the device further includes an external reservoir filled with a fluid and connected to the controllable opening, wherein the fluid is in fluid contact with the compensator, and the external reservoir forms a seal along with the controllable opening, excluding the liquid environment from the controllable opening.

In one embodiment, the device further includes a controllable opening having at least a first state and a second state, the controllable opening being in fluid communication with a second space between the compensator and the controllable opening, and a controller. The controllable opening separates the compensator and the second space from the liquid environment. The first state provides at least a partial opening between the liquid environment and second space, and the second state provides a fluid-tight seal between the liquid environment and the second space. The controller is configured to effect change between the at least two states of the controllable opening. In some embodiments, a depth sensor is interconnected with the controller, wherein the depth sensor provides liquid environment pressure information to the controller and the controller is configured to change the state of the controllable opening based on said liquid environment pressure information. In certain embodiments, an attachment mechanism is mechanically connected to the housing and informationally connected to the controller, and the attachment mechanism is configured to reversibly attach the device the submersible vehicle. The controller is configured to instruct the attachment mechanism to release the device from the submersible vehicle. In some embodiments, the chamber (i) defines the first chamber volume at a first chamber pressure to establish the first buoyancy when the vehicle is positioned at a first depth having a first environmental pressure in the liquid environment and (ii) establishes the second chamber volume having a second chamber pressure to establish the second buoyancy at a second depth having a second environmental pressure in the liquid environment.

This invention also features a ballast system for a submersible vehicle, including a plurality of passive ballast modules configured to be attached to the submersible vehicle, each comprising (i) structure configured to be exposed to the liquid environment, (ii) a compressible internal space, and (iii) at least one surface arranged between the liquid environment and the compressible internal space, and forming a fluid-tight seal with the structure. The structure resists a pressure exerted from the liquid environment, and the at least one surface is adapted to reversibly change the size of the compressible internal space in response to the pressure exerted from the liquid environment. In some embodiments, the at least one surface of the plurality of passive ballast modules have at least two resistive forces. In certain embodiments, the plurality of passive ballast modules and the submersible vehicle have a first buoyancy force at a first depth in the liquid environment, a second buoyancy force at a second depth in the liquid environment, and the first buoyancy force do not differ more than 20 percent from the second buoyancy force.

This invention further features a method for passively reducing buoyancy of a submersible vehicle in a liquid environment, including selecting a device an assembly including a chamber having at least one rigid wall to define at least a portion of a chamber volume, and a passively movable compensator having at least first and second surfaces, the first surface configured to be exposed to the liquid environment, the second surface excluded from the liquid environment, and forming, together with the at least one wall of the chamber, a fluid-tight seal to establish the remainder portion of the chamber volume, to exclude the liquid environment from the chamber volume and configured to adjust the chamber volume, also referred to herein as a first space, to at least a first chamber volume and a second chamber volume, also referred to herein as a first volume and a second volume, respectively, and wherein the chamber volume is configured to establish at least a first buoyancy and a second buoyancy. The method further includes placing the device in a liquid environment at a first depth, wherein the first depth has a first pressure and the device has a first buoyancy, and moving the device to a second depth, wherein the second depth has a second pressure, and allowing the second pressure to alter the compensator, to establish the chamber volume at a second volume, and establishing the device at a second buoyancy.

In some embodiments, the second buoyancy is substantially equal to the force of gravity. In one embodiment, the second volume of the first space is substantially zero. In an embodiment, the method further includes moving the device to a third depth, wherein the third depth has a third pressure, and wherein the compensator has bottomed out, substantially removing the volume of the first space. In certain embodiments, the chamber and the compensator are carried within a housing that is configured to be exposed to the liquid environment and a controllable opening is attached to the housing and configured to form a fluid-tight seal with the housing, defining a second space encompassed by the housing, the compensator and the controllable opening. In one embodiment, the controllable opening is configured to have at least two states, the first state providing at least a partial connection from the liquid environment to the second space, the second state providing a fluid-tight between the liquid environment and the second space, wherein the controllable opening is placed in the first state at the first depth, and further comprising changing the controllable opening to the second state after step (d) to exclude the liquid environment from the second space. In certain embodiments, the method further includes moving the device to a third depth, wherein the third depth has a third pressure, and wherein the first space does not respond to the third pressure. In some embodiments, the method includes deploying at least one transponder in the liquid environment and moving the device in a radial spiralling pattern in respect to one of the at least one transponder.

This invention still further features a passive ballast device, system, and method of using same including a chamber formed of a material that is rigid at a sufficient thickness to achieve the at least one rigid wall defining a portion of a chamber volume, and a passively movable compensator having at least first and second surfaces, the first surface configured to be exposed to the liquid environment, the second surface excluded from the liquid environment, and forming, together with the housing, a fluid-tight seal to establish the remainder of the chamber and to exclude the liquid environment from the chamber. The chamber has a chamber volume filled with a buoyancy fluid at a chamber pressure and (i) defines a first chamber volume at a first chamber pressure to establish a first buoyancy when the vehicle is positioned at a first depth having a first atmospheric pressure in the liquid environment and (ii) establishes a second chamber volume having a second chamber pressure to establish a second buoyancy at a second depth having a second environmental pressure in the liquid environment. The compensator is configured to respond to an increase in environmental pressure within the liquid environment at least until the second environmental pressure is reached, and the compensator is passively moved by the increase in environmental pressure to change the first chamber volume to the second chamber volume. The passive ballast device lacks a mechanism to apply a non-environmental force to the compensator.

The passive ballast hovering and maneuvering system invention is a device and method for submerged vehicles that allows them to achieve and maintain a desired depth in a liquid body with less power consumed, extending operation time and range. Preferred embodiments of the present invention utilize a small, low power vehicle (e.g. an AUV) with turning moment capable motor, a passive ballast system and autonomous, pre-programmed passive navigation system.

The passive ballast system is enabled by taking advantage of the pressure of a liquid, especially seawater, brackish water and/or fresh water, in a liquid body. The passive ballast system is compressed when exposed to increasing depths (and pressures) of a liquid body, reducing the vehicles volume and therefore buoyancy, allowing the vehicle to remain at the predetermined depth without any additional buoyancy compensation components.

The present invention may also be expressed as a novel system designed to passively change a vehicle's buoyancy. The invention takes advantage of the fundamental nature of fluid pressures present in a liquid body and volumetric mass density. Pascal's principal states that fluid pressure increases with depth and the fluid pressure is exerted in all directions. Therefore, there is an unbalanced upwards force on the bottom of a submerged object. Archimedes' principal further states the buoyant force of an object is equal to the weight of the water displaced by the object and can be expressed for a fully submerged object as:

$$\text{apparent immersed weight} = \frac{\text{weight}}{\text{weight of displaced fluid}} \qquad \text{(Eq. A)}$$

When density and volume are taken into account, the formula can be re-expressed as Equation B which takes into account the density of the submerged object relative to the density of the surrounding fluid.

$$F_b = \rho_f V_f g \qquad \text{(Eq. B)}$$

Where Fb is the buoyant force, ρf is the density of the displaced fluid, Vf is the volume of displaced fluid and g is the acceleration due to gravity. Finally, the present invention changes the vehicle's volume to drive a change the volumetric mass density of the vehicle. Volumetric mass density defines a substance's mass per unit volume. Mathematically, density (D) is defined as mass (m) divided by volume (V), as shown in Equation C.

$$D = \frac{m}{V} \qquad \text{(Eq. C)}$$

The buoyant force equation calculates the force acting on a submerged opposite to gravity. The overall buoyancy of a submerged object can be calculated by subtracting effect the force of gravity pulling the submerged down from the buoyant force. The force of gravity (Fg) is expressed in Equation D, where G is the universal gravitation constant, and m is the object's mass.

$$F_g = G \times m \qquad \text{(Eq. D)}$$

The passive ballast system drives a buoyancy change by changing the vehicle's displacement. Meaning that, while the mass of the vehicle remains constant, the volume of the displaced fluid is changed to alter the overall vehicle buoyancy. Critically, this entire system is driven by hydrostatic pressure without any actively driven mechanism, reducing system complexity and demands on the vehicle.

This invention may also be expressed as a submergible vehicle, for hovering and maneuvering at a given depth in a liquid body such as an aquatic environment. The vehicle includes a waterproof housing and a passive ballast mechanism including a chamber and a compensator forming a fluid-tight seal with the chamber and being responsive to a pressure from the external environment. In some embodiments, the vehicle further includes a compartment, or chamber to contain the possible movements of the compensator. In other embodiments, the vehicle further includes a piston or similar device providing resistance for the compensator when exposed to the pressure from the external environment. Still further embodiments further comprise at least one retaining mechanism to restrain the compensator. In some embodiments, the vehicle further includes a propulsion system, a programmable navigation system, a power source, and a controller. In certain embodiments, the chamber contains the compensator and the retaining mechanism, and the compensator is configured to be constrained between a first and second position by the retaining mechanism and the first and second positions are adjustable by a user. The passive ballast mechanism decreases in volume when the submergible vehicle descends to a depth in a liquid body, and the submergible vehicle obtains neutral buoyancy when the passive ballast system is constrained by the force of the liquid body to the second position.

This invention may also be expressed as a submergible vehicle including a compensator, a controllable opening, a controller, and a propulsion system. The controller instructs the sealable opening to open and close, allowing the external environment to be in contact with the compensator, and exerting a pressure thereupon. The controller can then 'lock in' a vehicle volume and buoyancy by closing the controllable opening at a certain depth. The vehicle can then move to second depth by its propulsion system, where the compensator would change if the controllable opening allowed the external pressure to exert onto the compensator.

BRIEF DESCRIPTION OF THE DRAWINGS

In what follows, preferred embodiments of the invention are explained in more detail with reference to the drawings, in which:

FIG. 2A is a schematic side view of three positions of an AUV deployed in a liquid body and having at least one ballast system according to the present invention, with the left-side positively-buoyant AUV position representing the start of a mission cycle, the center neutrally-buoyant AUV position representing operation at a selected depth and the right-side less-positively-buoyant AUV position representing operation between start and selected depths;

FIG. 2B is a schematic side view of an expanded, unconstrained configuration of a ballast system according to the present invention;

FIG. 2C is a schematic side view of the ballast system of FIG. 2B constrained in a displacement position $x_1$ corresponding to the left-side AUV position of FIG. 2A;

FIG. 2D is a schematic side view of the ballast system of FIG. 2B constrained in a displacement position $x_2$ corresponding to the center AUV position of FIG. 2A;

FIG. 2E is a schematic side view of the ballast system of FIG. 2B placed in a displacement position $x_3$ by the ambient pressure, and corresponding to the right-side AUV position of FIG. 2A, having less positive buoyancy than the left-side AUV position and more buoyancy than the center AUV position of FIG. 2A;

FIG. 5A is a schematic top view of a traditional "mow-the-lawn" type survey pattern over a region of interest;

FIG. 5B is a schematic top view of the region of interest of FIG. 5A being surveyed by a SPIRAL search pattern according to the present invention;

FIG. 5C is a schematic side view of two-channel side-scan sonar coverage for a traditional survey pattern similar to that of FIG. 5A;

FIG. 5D is a schematic side view of a SPIRAL search pattern similar to that of FIG. 5B using a single channel sonar;

FIG. 12D illustrates the density profile obtained from an ARGO float on Jan. 31, 2002 in the Indian Ocean, wherein the dotted line 1275 denotes density (in $kg/m^3$), the dashed line 1277 denotes salinity (in PSU) and the solid black line 1276 denotes temperature, with all three lines plotted against depth (in meters) on the y-axis and representing their respective units on the combined x-axis;

FIG. 12F illustrates the density profile of an underwater vehicle comprising a plurality of passive ballast modules, according to the invention; and FIG. 13A-13E illustrate one example of a semi-passive ballast embodiment of the system, similar to the embodiment shown in FIG. 3 above, the Auto-Ballaster, utilizing ambient pressure to drive ballast changes for use as an automated ballasting device, with FIGS. 13A and 13B being schematic exploded side views with an exterior housing removed, FIG. 13C being a schematic top view, FIG. 13D being a schematic top perspective view, and FIG. 13E being a bottom perspective, fully assembled view including the external housing.

DETAILED DESCRIPTION OF THE PRESENTLY PREFERRED EMBODIMENTS

Overview

Figure 1A:
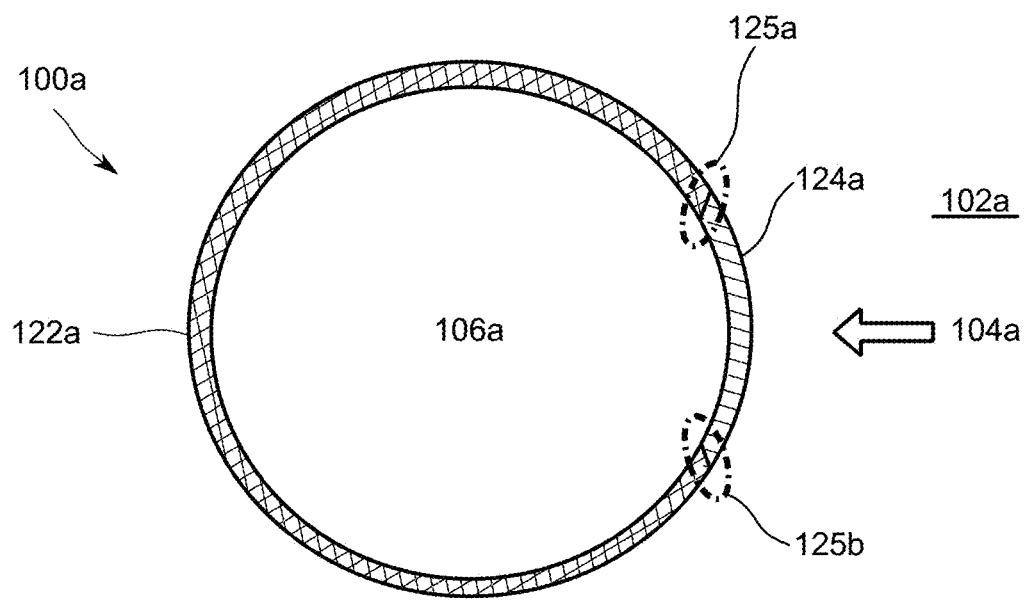
FIGS. 1A and 1B are highly schematic cross-sectional views of one embodiment of a ballast system according to the present invention when exposed to lower and higher amounts of external pressure, respectively.

This invention may be accomplished by a passive ballast device and method of using same, configured for use with a submersible vehicle in a liquid environment, including a rigid chamber, and a passively movable compensator having at least first and second surfaces, the first surface configured to be exposed to the liquid environment, the second surface excluded from the liquid environment, and forming, together with the chamber, a fluid-tight seal to establish a chamber volume and to exclude the liquid environment from the chamber volume. In particular, the chamber has at least one rigid wall to define at least a portion of a chamber volume, and a passively movable compensator having at least first and second surfaces, the first surface configured to be exposed to the liquid environment, the second surface excluded from the liquid environment, and forming, together with the at least one wall of the chamber, a fluid-tight seal to establish the remainder of the chamber volume, to exclude the liquid environment from the chamber volume and configured to adjust the chamber volume to at least a first chamber volume and a second chamber volume. The chamber volume is configured to establish at least a first buoyancy and second buoyancy, the compensator is configured to respond to a change in environmental pressure within the liquid environment, and the compensator is passively moved by the change in environmental pressure to change the first chamber volume to the second chamber volume, thereby changing from the first buoyancy to the second buoyancy. In a number of constructions, the passive ballast device lacks a mechanism external to the chamber to apply a non-environmental force to the compensator.

In some constructions, the chamber is formed of a material that is rigid at a sufficient thickness to achieve the at least one rigid wall defining a portion of the chamber volume. In certain constructions, the chamber (i) defines a first chamber volume at a first chamber pressure to establish a first buoyancy when the vehicle is positioned at a first depth having a first atmospheric pressure in the liquid environment and (ii) establishes a second chamber volume having a second chamber pressure to establish a second buoyancy at a second depth having a second environmental pressure in the liquid environment.

A simple, energy-free ballast system that takes advantage of the ambient pressure of the external environment, to change the buoyancy of a submerged object. A net volume change of the system (and therefore a change in the volume of displaced fluid) is driven by passively expanding and collapsing a volume associated with the system. This passively altered volume described herein represents a reserve buoyancy that can be negated as the vehicle descends, and re-activated as the vehicle ascends through the fluid body. Furthermore, the system can be designed to compress at relatively shallow depths (e.g. 5 to 10 meters), allowing for near neutral buoyancy at all operating depths. The system is suitable for incorporation into almost any submerged object that operates at multiple depths in a liquid body. The system provides a compensator that can change the displaced volume of the submerged object, changing the object's buoyancy without active, power-consuming components, reducing energy requirements and extending mission times for the submerged object.

The Passive Ballast system of the present invention enables a submersible vehicle or other object to have variable buoyancy without actively pumping fluids into and out of the vehicle. A vehicle with a passive ballast system according to the present invention achieves both positive buoyancy while at the water's surface, reduced buoyancy while submerged, and neutral buoyancy at a target depth. The invention utilizes ambient water pressure to drive a net volume change of buoyancy fluid. As a completely passive system, this system requires no control or energy from the vehicle. A semi-passive embodiment of the inventive system further employs a controllable valve, allowing the object's volume to be selectively 'locked in' regardless of the ambient pressure, further enabling buoyancy fine-tuning. These passive and semi-passive systems are dramatically smaller, simpler, and less expensive than existing active ballast systems, while affording a vehicle the added endurance and extended range benefits of neutral buoyancy. They are particularly lucrative for the small, low-power, low-cost AUV paradigm by transforming power-starved development vehicles into true long-endurance oceanographic sensing platforms. Furthermore, embodiments of the present invention can be combined with active ballast systems to create hybrid ballasted vehicles.

The terms "buoyancy compensator" and "compensator" as utilized herein refer to a non-rigid structure that is exposed to an ambient pressure in a liquid environment, and is configured to deform or move in response to that pressure, affecting the chamber's volume. The chamber volume is formed by the compensator and one or more rigid walls of the chamber, and sealed off from the fluid environment, such that it displaces the surrounding liquid environment.

The term "generally" as utilized herein refers to at least a majority of a recited feature, such as "a generally radial spiraling pattern" described below in relation to FIGS. 4C, 5B, 5D, 6B and 6E.

The term "effective" as utilized herein refers to the actual parameter experienced during use of a device according to the present invention, such as an "effective survey" by a user.

The term "fluid environment" as used herein refers to any environment, area or local that contains a substance that can flow, typically water, but may also be any large body of other liquids, such as seawater, oil, gas, a mixture of liquids, a mixture of liquids and particulates, or complex solutions. The term fluid environment refers to the surrounding environment around a submerged vehicle, but also to the area or environment around a compensator. The fluid environment around the compensator need not be contiguous with a larger body of whatever the attached vehicle is submerged within.

The term "substantially" as utilized herein encompasses deviations of up to ten percent, such as "substantially neutrally buoyant" or "substantially uniform radial spiraling pattern" encompassing deviations up to ten degrees from each other.

The term "resistive force" as utilized herein refers to the force opposite to (i.e. resisting) the pressure from the ambient, liquid environment. The resistive force most often comes from a biasing resistive force due to compression, elastic (stretch), and tension forces of the compensator. In some embodiments, the resistive force is applied against the liquid environment's pressure by a fluid barrier portion of the compensator and a biasing mechanism mechanically connected to the fluid barrier portion.

The term "variable ballast" as utilized herein refers to a ballasting system that is configured to have liquid (e.g. ballast) actively moved into and out of a ballast tank. Most often, active ballast movement involves pumps or piston driven liquid movement. Variable ballast systems provide submerged vehicles with the ability to change vehicle buoyancy, albeit with added complexity and power, size and weight demands.

The term "ballast engine" or "buoyancy engine" are utilized herein interchangeably and refer to a submersible vehicle's use of buoyancy changes inside the vehicle, such as a glider, to drive lateral movement through a liquid.

The term "fluid-tight" as used herein refers to at least two objects that form a seal such that no gas or liquid can move from one side of the two objects to the other side. The compensator of the present disclosure is described as fluid-tight to its adjoining component (depending on the embodiment, most often the chamber), meaning that liquid or gas from the chamber anterior space cannot pass between the seal created by the compensator and the chamber's internal walls to the chamber posterior space and vice versa.

The term "vehicle" as referred in this disclosure is any controllable object that can physically move through the desired medium, typically seawater or other liquid. The vehicle can be any appropriate object, as commonly known in the art, including but not limited to a ship, boat, barge, or other human-occupied vehicle, AUV (autonomous underwater vehicle), remotely operated vehicles (ROVs), unmanned underwater vehicles (UUVs), submarine, glider, buoy, a platform, or other submersible craft.

The terms "submerged vehicle" or "submergible vehicle" or "submersible vehicle" as used herein refers to any motile vehicle, vessel or device capable of being introduced into and operating within or on the liquid, or liquid body. Many submerged vehicles are commonly referred to as underwater vehicles, although they may operate in other fluids besides water. In this disclosure, a submerged vehicles includes, but is not limited to AUVs, drones, ROVs, UUVs, submarines manned or unmanned, amphibious vessels and the like.

Figure 1B:
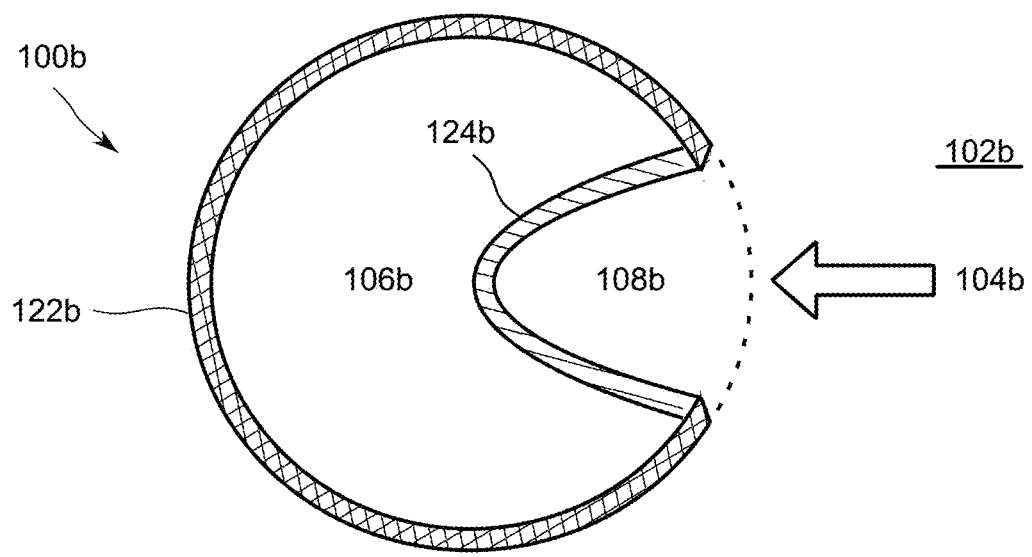

In a simplified form relying only on resistive force changes in a fluid barrier portion of a compensator, the inventive system includes a passive ballast device 100a and 100b of FIGS. 1A and 1B, respectively, having a rigid chamber 122a, 122b that is substantially spherical in this simplified construction and connects to, and forms a fluid-tight hermetic seal 125a and 125b (representing outer edges of a cross-sectional view of a single seal) with, a mechanism 124a, 124b to establish a chamber volume at a chamber pressure. The rigid chamber must resist pressure applied to it from the liquid environment. Typical pressures include those found at 100 meters depth. Some embodiments further resist pressure found at 300 m, 1000 m, 3000 m. Most often the chamber is made out of durable plastic, aluminium, steel, a titanium alloy and the like, as known in the art. The mechanism 124a, 124b is capable of changing the chamber volume, which is referred to as the first, internal chamber volume 106a, 106b, and this internal chamber volume is sealed away from the external, liquid environment by the chamber 122a, 122b and the volume changing mechanism 124a, 124b. The volume changing mechanism, referred to herein as the buoyancy compensator 124a, 124b, or as simply the compensator 124a, 124b, is constructed to change shape or position, resulting in increased forces of tension (in this construction) and/or compression on the compensator (collectively a resistive force), when exposed to an altered external environmental pressure and that change results in a net volume change of the pressurized vessel as a whole. An explicably simplified embodiment is depicted in FIG. 1A, where a spherical rigid wall of chamber 122a is combined with a compensator 124a having a flexible surface (e.g., serving as a diaphragm-like membrane or partition) disposed over one portion and connected to the chamber 122a at its perimeter to complete a fluid- and pressure-tight chamber volume 106a with the chamber 122a. The chamber volume 106a contains a buoyancy fluid and compensator 124a prevents liquid or gas from entering or escaping the device 100a.

When the compensator 124a is exposed to low levels of external environmental pressure, represented by arrow 104a, FIG. 1A, e.g., an ambient pressure of one atmosphere at the ocean's surface, the membrane 124a is in its initial position (e.g. flat or bowed out), giving the internal space 106a a certain internal chamber volume, also referred to herein as a buoyancy chamber volume, with an internal chamber pressure. When the sphere is exposed to an elevated external environmental pressure, represented by arrow 104b in FIG. 1B, e.g. at a second depth in an ocean, the flexible membrane 124b is initially exposed to two different and unequal pressures: the internal pressure (from a lesser depth), and the ambient external environmental pressure (increased at a greater depth). Therefore, the compensator 124b will deform away from the area of highest pressure in towards the interior of the sphere 100b, resulting in a decrease of internal volume 106b, an increase of internal chamber pressure, and a change in buoyancy. The decreased space no longer in the internal chamber volume, due to the compensator's movement, can be termed an external space or a second space 108b. Second space 108b is contiguous with the external environment and has the same ambient pressure as the external environment. The sum volumes of second space 108b and internal chamber space or volume 106b are substantially equal to the volume of internal chamber space or volume 106a.

It is to be understood that the compensator 124a, 124b can be any suitable structure that is deformable and/or otherwise passively movable in response to pressure, as described more fully below. While the present invention can be accomplished with such a simplistic system as illustrated in FIGS. 1A-1B, which continually adapts to environmental pressure and therefore is always in an adaptive state until a maximum adaptive threshold is reached, in practice, submersible objects often contain complex internal components, and it is not practical to accommodate an unrestricted compensator, and more utility is gained with additional structural components. Embodiments with further components will be now discussed in more detail, however each embodiment maintains the principle of passively responding to external environmental pressure to vary internal volume in order to change submersed object buoyancy.

Passive ballast system configurations 220c, 220d and 220e, FIG. 2A, are established for AUV positions 200c, 200d and 200e, respectively, in a water column or other liquid body. As described in more detail below, in some embodiments, a compensator (e.g. a fluid-tight surface) 224 is physically constrained to only move between compensator positions p1 and p2 by retaining mechanisms (stops) 228 and 230, thereby producing displacement $x_1$ at stop 228 and displacement $x_2$ at stop 230 in this construction. The buoyancy chamber volume is thereby changed from greater buoyancy chamber volume 106c, FIG. 2C, to lesser buoyancy chamber volume 106d, FIG. 2D, while the flooded external space increases on the external side 225 of the compensator 224 within chamber 232. In other words, this passive ballast system continually adapts to environmental pressure until displacement $x_2$ is reached, that is, passive ballast system is in an adaptive state until stop 230 is reached, which provides a maximum adaptive threshold.

Resistance to compressive forces (e.g. the resistive force) from compensator 224 movement is further provided in this construction by an optional biasing mechanism, referred to herein as biasing member 227. At depths shallower than $Z_1$, the biasing force (e.g. a spring force) of biasing member 227 exceeds the ambient pressure in the liquid environment, and in this zone 210 the vehicle remains positively buoyant, with the compensator 224 pressed against upper stops 228 as shown in FIG. 2C due to the biasing force supplied by the biasing member 227. Between $Z_1$ and $Z_2$ the biasing member and (external) ambient hydrostatic forces come closer into balance, as the vehicle approaches $Z_2$. This depth zone is termed the transition zone 211. At depth $Z_2$, the biasing member and hydrostatic forces are in substantial balance. At depths below $Z_2$, such as shown for AUV 200d, the hydrostatic pressure exceeds the biasing force of biasing member 227, as shown in FIG. 2D, and the vehicle remains neutrally buoyant, in a zone of neutral buoyancy 212.

In other words, as the chamber interior volume decreases, the flooded volume of the external space 108d increases, and the overall unflooded buoyancy chamber volume of the vehicle decreases. This change in vehicle buoyancy volume reduces the buoyancy of the vehicle to a level that can be tuned based on the stiffness of the biasing member 227 and the position of any retaining mechanism 230 (e.g. lower stops). When the vehicle reaches a second depth $Z_2$, the system enables the vehicle to be neutrally buoyant. When the vehicle returns above the first depth $Z_1$ (e.g. the surface), the spring force overcomes the ambient pressure and "blows" the ballast and allow the vehicle to float on the surface.

In further embodiments described elsewhere herein, the second depth is tunable by a user. In some embodiments the passive ballast mechanism is tuned before the vehicle's mission, in other, highly preferred embodiments, the tuning is activated by a datalink to the vehicle from a remote vehicle or station.

When the vehicle is in the transition zone 211, the overall vehicle buoyancy is positive, but the amount of buoyancy is less than at the liquid surface SS, or in depths shallower than $Z_1$. The hydrostatic pressure from the liquid environment exerts enough force to displace the compensator 224e into passive ballast system 220e, as shown in FIGS. 2A and 2E. However, the hydrostatic pressure at these depths are not enough to depress the compensator 224e entirely to lower stop 230.

Figure 3A:
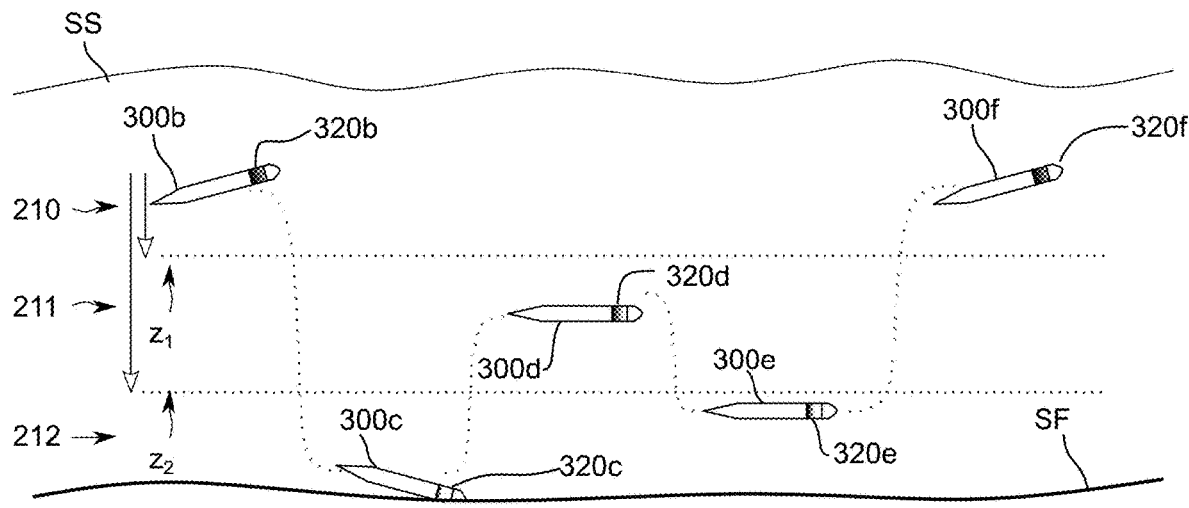
FIG. 3A is a schematic side view of five positions of an AUV deployed in a liquid body and having alternative, valve-controlled, semi-passive ballast systems according to the present invention, with the first and fifth positively-buoyant AUV positions representing the start and finish of a mission cycle above depth $Z_1$, the second AUV position representing a "soft-anchored" AUV positioned below depth $Z_2$, the third AUV position representing equalized pressure while the AUV is in a pressure transition zone with its valve becoming closed, and the fourth AUV position having a fully closed valve to retain neutral buoyancy below depth $Z_2$.
Figure 3B:
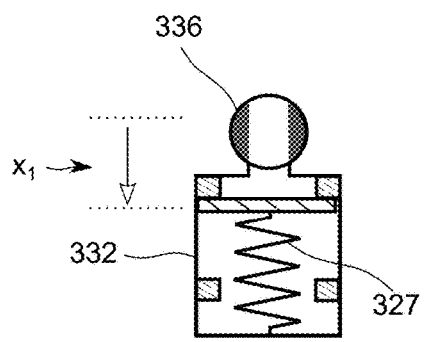
FIGS. 3B-3F are schematic side views of the ballast systems of the first through fifth AUVs of FIG. 3A, respectively.
Figure 3C:
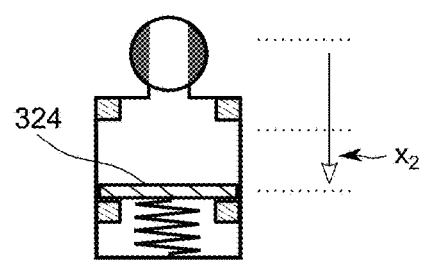
Figure 3D:
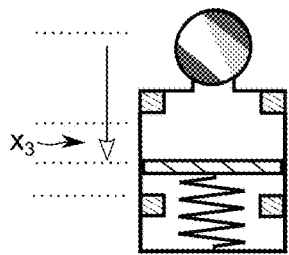
Figure 3E:
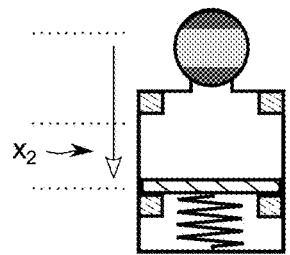
Figure 3F:
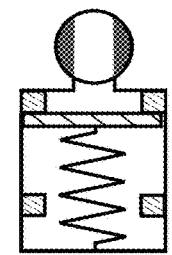

FIGS. 3A-3E illustrate a semi-passive ballast system according to the present invention. The compensator 324 with biasing member 327 is similarly physically constrained to only move between displacements $x_1$ and $x_2$ and further comprises a controllable opening 336, which enables the system to further fine-tune the buoyancy of the vehicle by controlling the adaptive state of the system. At depths shallower than $Z_1$, such as for AUVs 300b and 300f, the biasing force of biasing member 327 exceeds the ambient pressure, FIG. 3B, and the vehicle remains positively buoyant. At depths below $Z_2$ and when the controllable opening 336 is open, allowing the liquid environment to exert pressure on the compensator 324, the hydrostatic pressure exceeds the biasing force, fully compressing the biasing member 327 (e.g. the spring) as shown in FIG. 3C. This could potentially be used for "soft anchoring" AUV 300c on the liquid environment floor (e.g. the seafloor) SF if the vehicle is negatively buoyant. Between transition depths $Z_1$ and $Z_2$ the biasing and hydrostatic forces balance each other. The controllable opening 336 (e.g. valve) can be opened and closed at the desired depth to equalize pressure and "lock in" the vehicle to a given buoyancy, FIG. 3D, which terminates or suspends the adaptive state of the system until the valve is reopened. This allows the vehicle 300d to have a set buoyancy at any operating depth. Preferably, this allow the vehicle to be neutrally buoyant at any depth above, below, or within the transition zone. Upon return to the surface, the valve can be partially opened, FIG. 3D, or fully opened, FIG. 3F, to allow the AUV to "blow" its remaining ballast, providing positive buoyancy to float with its antennas above the surface. In other words the fifth AUV position having driven above depth Z1 while having a fully closed valve, locking in neutral buoyancy, then opening said valve to regain positive buoyancy at or above depth $Z_1$.

Figure 4A:
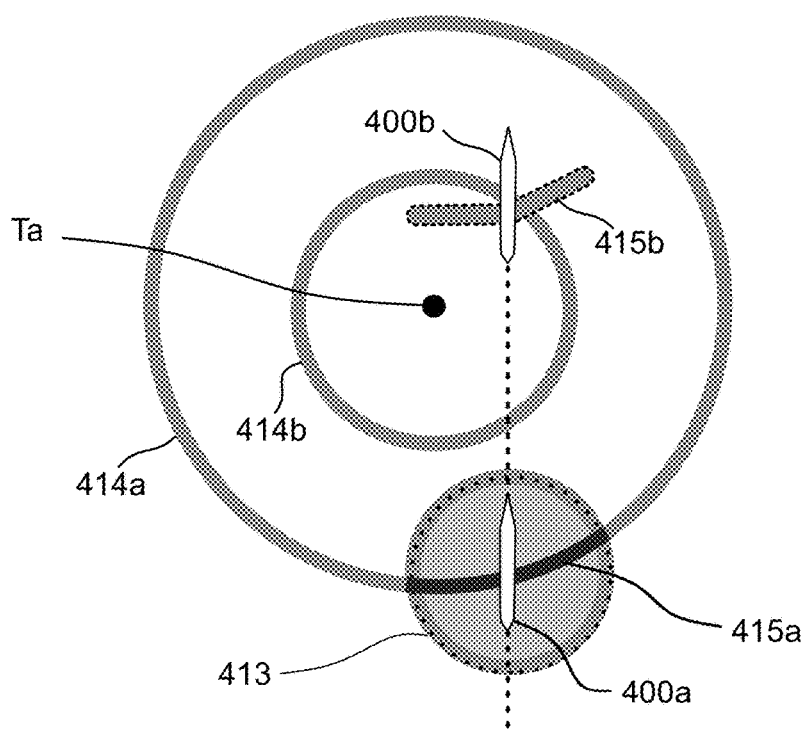
FIGS. 4A and 4B are schematic top views illustrating position uncertainty for an AUV relative to a single transponder.

FIG. 4A illustrates the paradigm of single transponder navigation. An AUV's position uncertainty, denoted by the dashed circle 413 for AUV 400a, is directionally constrained by ranges to an acoustic transponder Ta, with range uncertainties denoted by the arcs 415a, 415b for AUVs 400a, and 400b, respectively.

Figure 4B:
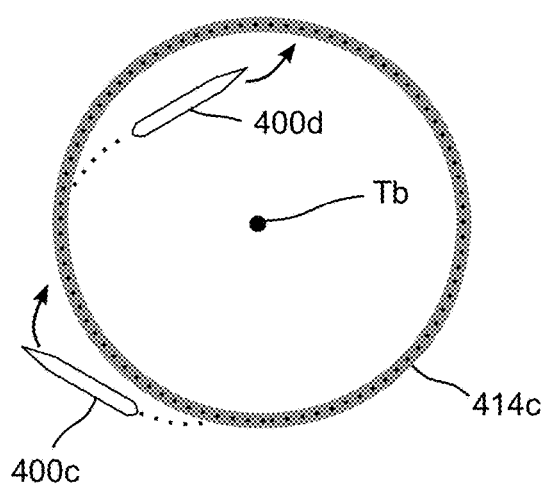
Figure 4C:
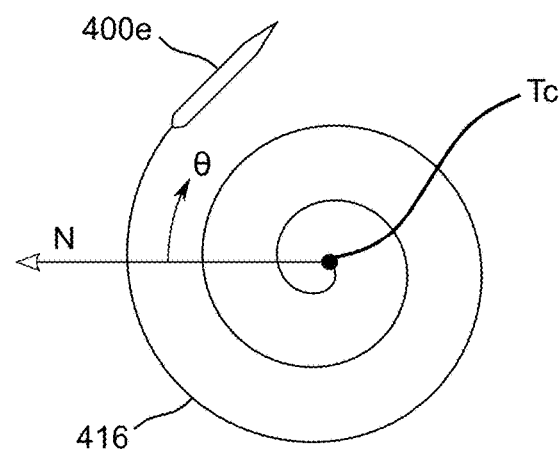
FIG. 4C is a schematic top view of an innovative SPIRAL (search pattern integrating radial acoustic localizations) radially spiraling search pattern conducted by an AUV according to the present invention.

Ideal geometries for constraining navigational uncertainty arise from orthogonal bearings to the transponder such as attempted in FIG. 4B where the optimal path to maximize the recurrence of orthogonal bearings is a circle 414c about transponder Tb. The control logic for this geometry is simple: when the measured ranges exceed a threshold, turn inward, and vice versa. Extending this approach to areal coverage results in a radial spiraling pattern 416, FIG. 4C, that is easily computed in polar coordinates relative to transponder Tc. Ranges are measured directly, with the desired range a function of the estimated along-track distance $\theta$. This one-dimensional estimation is much simpler than the traditional two-dimensional Cartesian approach to navigation.

FIG. 5A: A traditional mow-the-lawn type survey over a region of interest RI, comprising vehicle 500a movement tracks of multiple, parallel straight survey lines 517 and turns 518 to connect said straight lines 517. Turns 518 can constitute an appreciable fraction of the mission, during which time the vehicle dynamics can degrade sensor data and increase the error in inertial navigation estimates. FIG. 5B: the proposed spiraling pattern 416 according to the present invention has no necessarily sharp turns, following a smooth path over the region of interest. FIG. 5C: side-scan sonar coverage for traditional missions can be compared to a spiraling pattern 416 shown in FIGS. 5B and 5D using a single channel sonar, with sonar scans shown in shaded regions. Because of the nadir gap NG in two-channel side-scan sonar systems, shown as dashed lines on the port side (left of forward facing AUVs 500a and 500c, right of rear-ward facing AUV 500b) and solid lines on the starboard side (reverse of port side), alternating track lines are more closely spaced to ensure full coverage of an area. Additional coverage by multiple passes is shown by darker shading. With the proposed spiraling pattern of FIGS. 5B and 5D, continuous spacing produces full coverage while only using a single channel. Furthermore, sufficient overlap could allow the recovery of bathymetric information along seafloor SF using feature-based methods, such as indicated by the arcs shown for AUVs 500e and 500f in FIG. 5D.

Figure 6A:
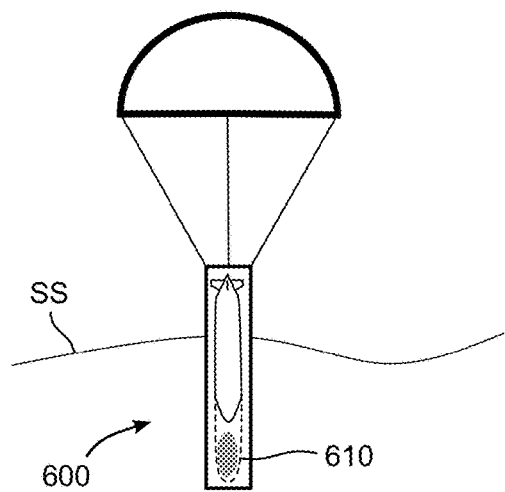
FIGS. 6A-6D are schematic side views of different stages of deployment and operation of an AUV search system according to the present invention.
Figure 6B:
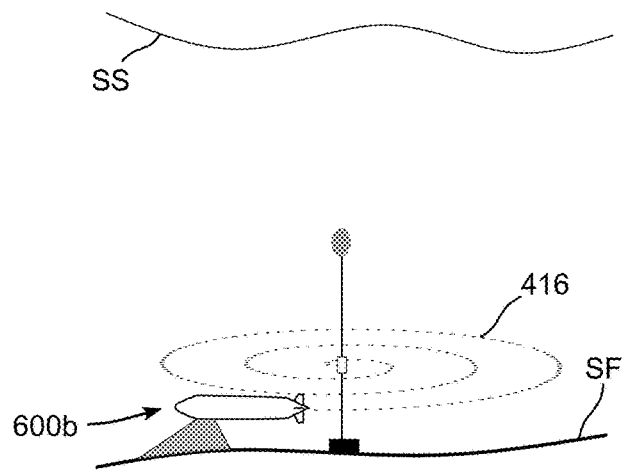

FIGS. 6A-6E illustrate a possible over-the-horizon deep water AUV system. (A) The system 600, FIG. 6A, can be ruggedly deployed from a wide variety of surface or aerial platforms. Once submerged as shown in FIG. 6B, a releasable package 610, in this case comprising a transponder 612, connected to a mooring 614 and a floatation device 616, automatically deploys and the radial spiraling pattern 416 is carried out by AUV 600b.

Figure 6C:
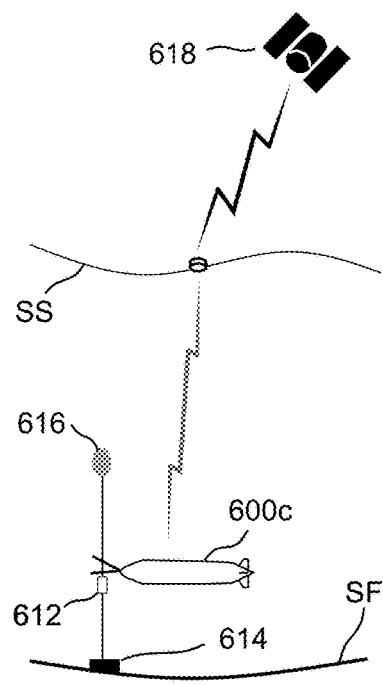
Figure 6D:
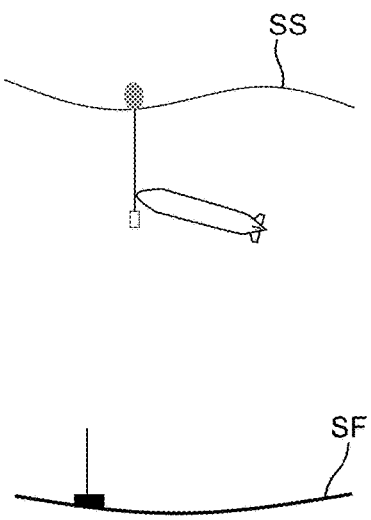
Figure 6E:
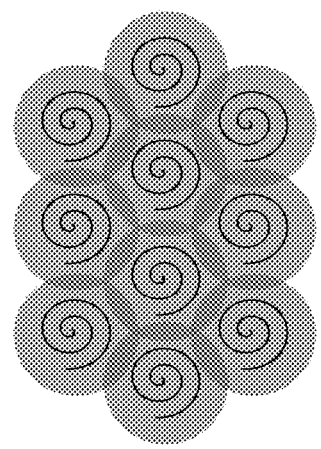
FIG. 6E is a top view of a fleet of AUV systems deployed as illustrated in FIG. 6B each AUV system having an overlapping search pattern.

Upon completing its mission, FIG. 6C, AUV 600c homes in on the transponder 612, docks to the mooring line, and can release a buoyant data module or the transponder to relay back mission information to operators via satellite 618. This module could also serve as a gateway to relay secondary mission instructions from shore-based operators to the AUV. When a platform of opportunity is in the vicinity, the anchor can be released, FIG. 6D, and the system recovered. Alternatively, the AUV could undock from the mooring line for other recovery methods. With a conservative endurance on the order of days, a fleet of these systems could be deployed as illustrated in FIG. 6E to survey thousands of square kilometres in less than a week.

Figure 7A:
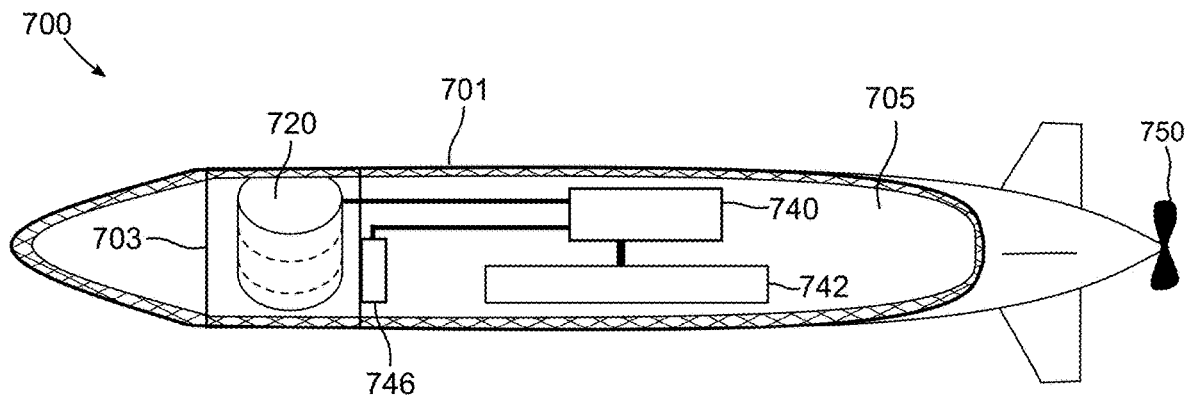
FIG. 7A is a schematic side cross-sectional view of an AUV carrying a passive ballast system according to the present invention in a fore free-flooded compartment.
Figures 7B, 7C:
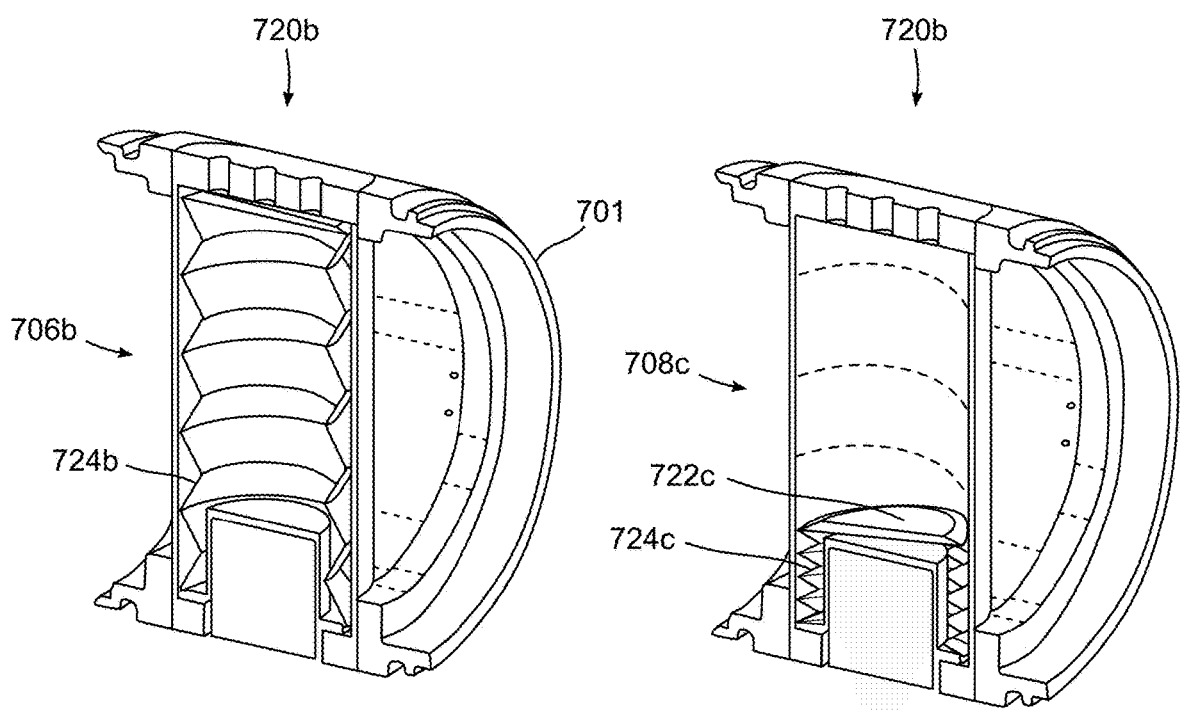
FIGS. 7B and 7C are schematic enlarged views of the free-flooded compartment of FIG. 7A with compensator in first and second compensator positions, respectively.

FIG. 7A is a schematic side cross-sectional view of an AUV carrying a passive ballast system according to the present invention affixed in a fluid-flooded fore compartment 703. This compartment is exposed to the liquid environment. In some embodiments, the exposure is direct, and the liquid environment may freely flow into and out of compartment 703, as commonly known for underwater vehicles. Further description of freely flooded compartments can be found in Riqaud et al. (Proceedings of the Fourteenth International Offshore and Polar Engineering Conference, 2004), incorporated by reference in its entirety herein. In other embodiments, compartment 703 excludes the liquid environment (e.g. fluid-tight), but accepts and transfers pressure from the liquid environment into its interior (i.e. compartment 703 acts as an external reservoir). FIGS. 7B and 7C are schematic enlarged views of ballast compartment 703 of FIG. 7A with the bellows compensator 724b, 724c in first and second positions, respectively, with rigid wall 722c of a chamber defining first and second chamber volumes within bellows compensator 724b, 724c, respectively. Second space 708c is contiguous with the liquid environment.

Figure 8A:
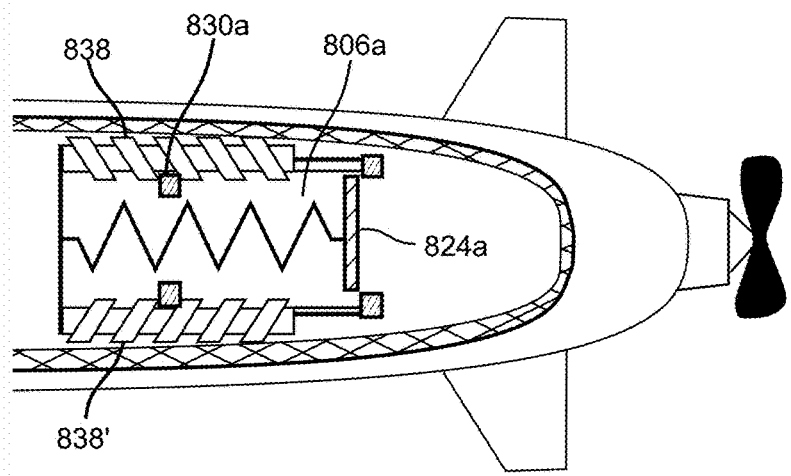
FIGS. 8A-8C are schematic views of an embodiment of the current invention having a tuning mechanism to adjust one retainer, with FIGS. 8A and 8B being similar to FIGS. 2C and 2D above of an alternative AUV ballast system according to the present invention, with the lower stop retaining mechanism in a first position, and FIG. 8C being a schematic view of the embodiment shown in FIGS. 8A and 8B with the lower stop retaining mechanism moved to a second position by the tuning mechanism.
Figure 8B:
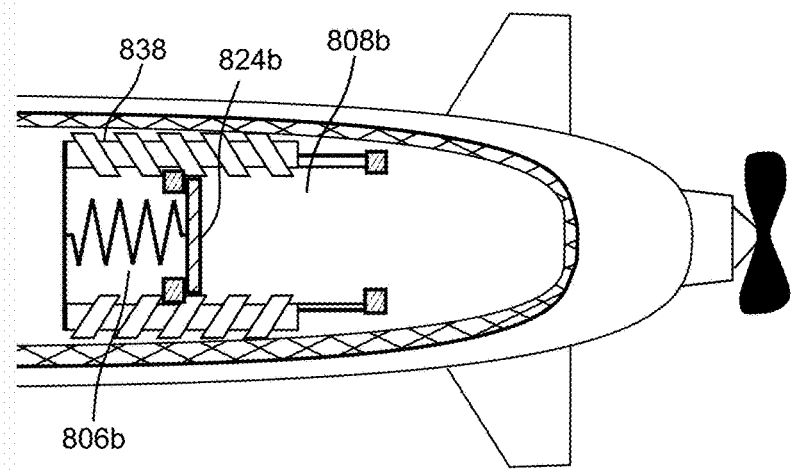
Figure 8C:
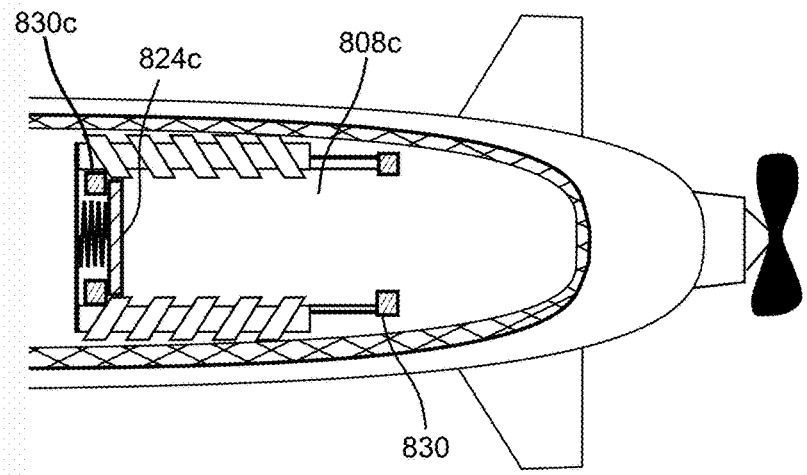

FIGS. 8A and 8B are views similar to FIGS. 7B and 7C of an alternative AUV according to the present invention. In this embodiment, the passive ballast system 820 further comprises tuning mechanism 838 and 838' that are configured to adapt, translate or transport lower stop retaining mechanism 830a from a first location (FIG. 8A) to a second location shown as lower stop 830c (FIG. 8C). This movement allows for additional volume 808c changes available to the system.

Passive Ballast

Submerged vehicles, including AUVs, submarines, gliders, profiling floats, torpedoes, and the like, often employ actively pumped or piston-driven systems to change vehicle buoyancy. Some vehicles, especially gliders, change buoyancy repeatedly, using the buoyancy change as an engine for movement through the water column. Conventional gliders must use an active buoyancy system to achieve the changes in buoyancy. These vehicles pump a fluid, often a mineral oil, between two bladders, one internal, and one external to the hull, and consequently exposed to internal and external pressures, respectively. The pumping changes the displaced volume of the glider, and in turn the buoyancy of the vehicle. The present inventive system does not rely on active pumping, but instead utilizes a novel buoyancy system and ambient fluid pressure to achieve positive buoyancy at the liquid body surface (first depth) and the vehicles' propulsion system to transition to a second depth in the liquid body. The ambient environmental liquid pressure changes the buoyancy of the vehicle by activating the passive ballast system, as the vehicle changes depths.

Buoyancy Compensator

The present invention provides for an automatic, responsive buoyancy compensator 224, FIGS. 2B-2E, that allows for the external pressure to translate into a change of the system's internal chamber volume. In some embodiments, the compensator 224 alone enables the change in internal volume. In other embodiments, the system further comprises a biasing mechanism 227 interconnected with the compensator. As the vehicle changes depth, the external pressure will exert a force on the compensator 224, causing it to displace into the system (that is, into the chamber 232). The external space 108d, FIG. 2D, vacated by the compensator becomes fillable by environmental liquid, resulting in an overall decrease of the system's buoyancy. The compensator 224 may be constructed in any physical manner that allows for it to respond to external pressures.

Figure 10A:
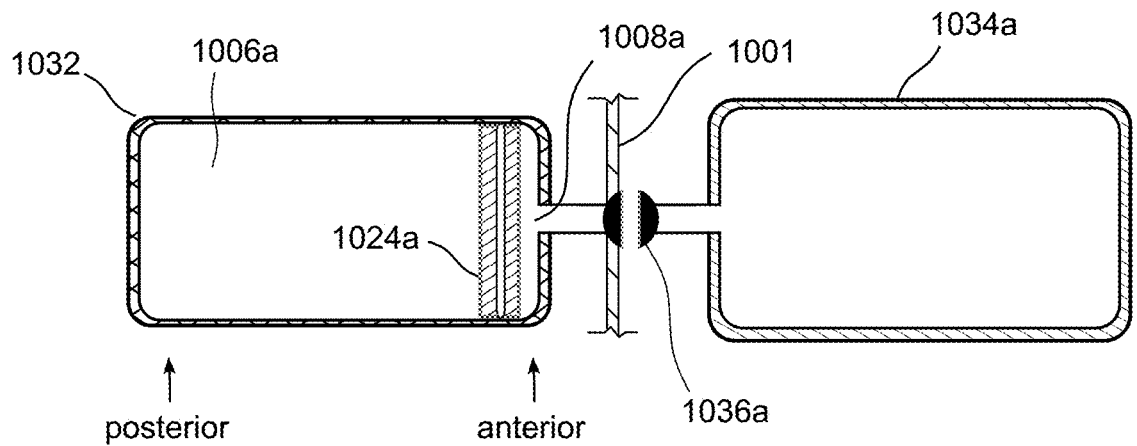
FIG. 10A-C are schematic side, partial cross-sectional views of three possible states of one embodiment of the semi-passive ballast system, with FIG. 10A illustrating the system when the vehicle is positively buoyant with the compensator near the chamber anterior side, and the majority of the chamber is void space, with FIG. 10B illustrating the system of FIG. 10A when it experiences hydrostatic pressure, driving the working fluid of the external reservoir through the open controllable opening and against the compensator, and FIG. 10C illustrating the system of FIG. 10B when the controllable opening is transitioned to a closed state, giving the vehicle a set or fixed buoyancy.
Figure 10B:
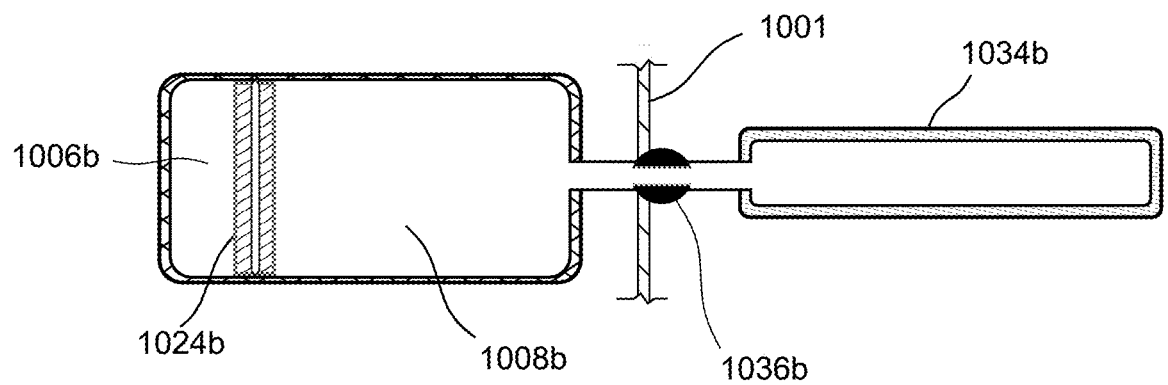
Figure 10C:
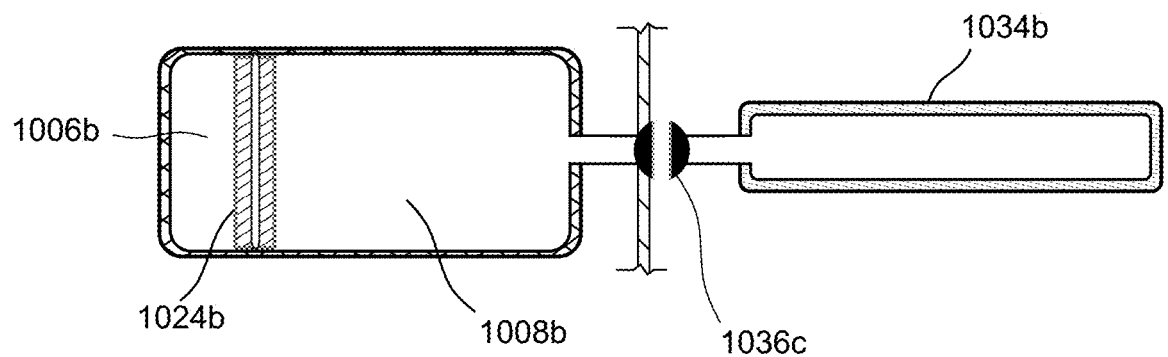

The compensator 224 may be directly exposed to the liquid environment and its external pressure as illustrated in FIG. 1, or indirectly as illustrated in FIGS. 10A-10C. Indirect contact is facilitated by an external reservoir, or other similar mechanism as known in the art.

In the currently preferred embodiment, the passive ballast system 220 comprises a compensator 224 and biasing member 227. In one preferred embodiment, the biasing member 227 comprises a spring and the compensator 224 comprises a water-tight component. Typically the compensator 224 is planner, with two surfaces, or faces, the first surface 225 is exposed to the pressure of the liquid environment. The second surface 226 is opposite the first surface and is excluded from the pressure of the liquid environment. The second surface 226 is exposed to the internal space 106. The compensator further comprises at least one additional surface that is connected to the chamber 232; this at least one additional surface is where the pressure- and fluid-tight seal is created, excluding the liquid environment and the pressure therefrom.

The forces exerted on and created in springs are well known, making springs ideal biasing mechanisms. The external compressive pressure is exerted onto the compensator, and is in turn transferred to the interconnected spring member 227. The changing force experienced by the spring, causes the spring to compress or expand, moving the biasing mechanism, and changing the ratio of fluid-filled volume to unfilled volume (void) in the system.

In the currently preferred embodiment, the biasing member 226 includes a spring with enough biasing force to resist the force of a fluid at the fluid body surface (approximately 1 atmosphere), but not enough biasing force to resist the force of the fluid at deeper depths (increasing atmospheres of pressure). The biasing force required is described in the Spring and Pressure Formulas Section elsewhere herein. The biasing force of the spring and the overall resistive force of the system (e.g. biasing mechanism and compensator) are fully scalable, depending at least on the passive ballast system's size, and space filler.

The biasing mechanism may comprise any suitable mechanism that can reversibly receive pressure. For example, any spring as known in the art, a bellows, bladder, diaphragm, compressible form, compliant form, a piston, a hydro-pneumatic device, and the like. In the currently highly preferred embodiment, a compression spring is used. In other embodiments a coil spring is suitable.

In one embodiment the compensator has a resistive force to resist only 2 to 10 meters of fluid depth, preferably 2 to 5 meters of fluid depth. Such an embodiment would bottom out at two to five meters, and the system and attached submersible vehicle would be neutrally buoyant, allowing vehicle operation at depths below 2 to 5 meters to be carried out with neutral buoyancy.

Figure 12E:
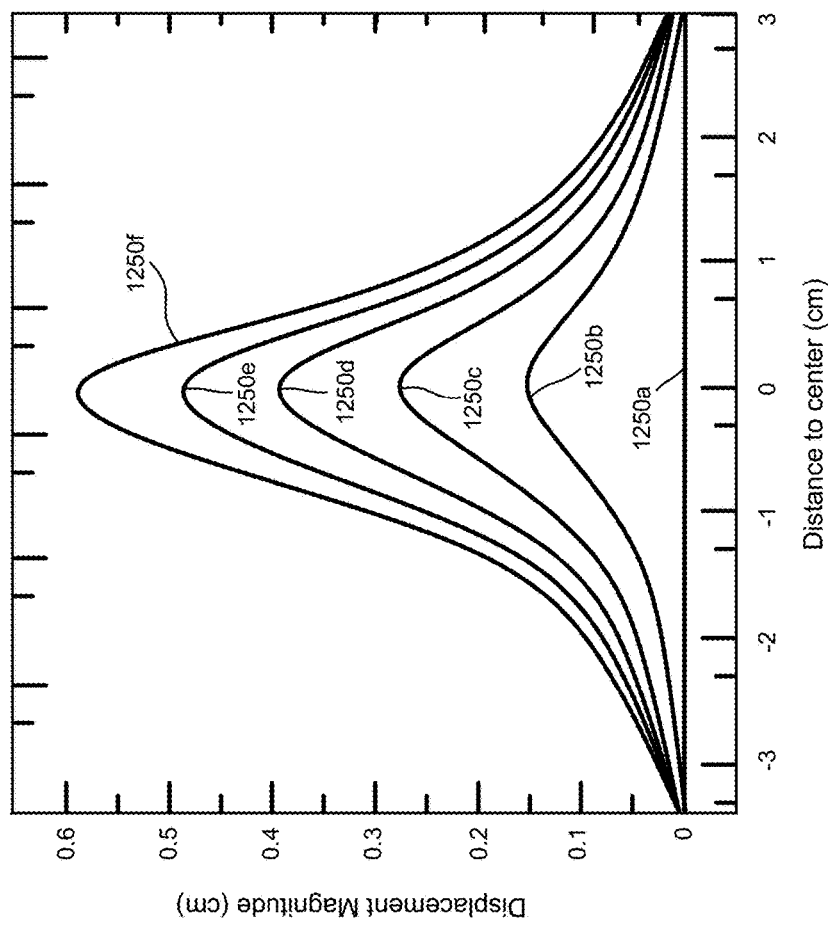
FIG. 12E illustrates the adaptive volume available to one embodiment having a deformable membrane compensator mechanism, with different volumes at different ambient pressures.
Figure 12A:
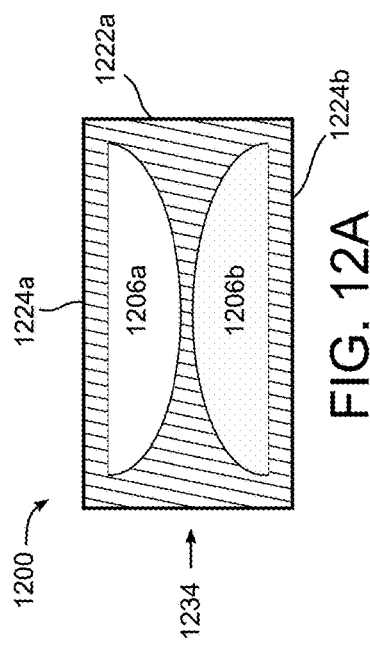
FIGS. 12A-12C are schematic side views of one embodiment comprising a deformable membrane compensator mechanism, with FIG. 12A in the initial non-deformed state, with FIG. 12B being a side view of the embodiment shown in FIG. 12A now in a partially deformed state, and FIG. 12C being a side view of the embodiment shown in FIGS. 12A and 12B, now in the fully deformed, or bottomed-out state.
Figure 12B:
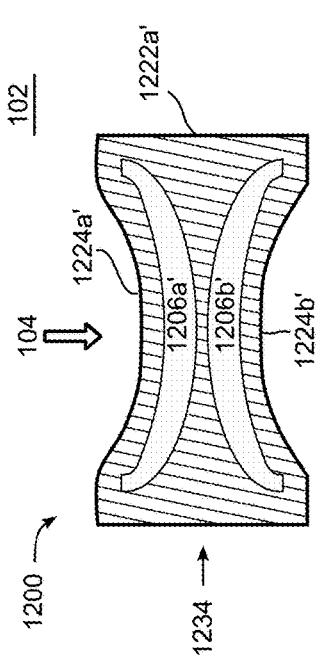
Figure 12C:
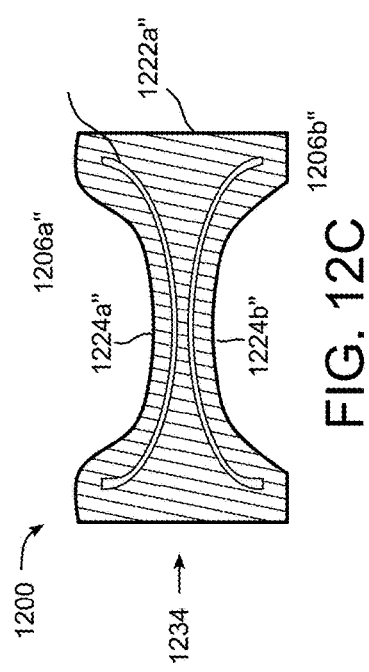

In another currently preferred embodiment, the compensator 224 comprises at least one deformable membrane. In these embodiments, the compensator comprises an elastic structure within and attached to the chamber. The deformable membrane compensator is attached to the chamber such that it is fluid-tight, and separates the external environment from the internal space (void). As the vehicle descends, the density (and therefore pressure) of the external environment increases. The pressure is exerted onto the deformable membrane compensator, and it deforms into the chamber volume. Again, as the compensator deforms, the ratio of void to fluid-filled space changes, resulting in a change in vehicle buoyancy. In this embodiment, the chamber is most often bowl-shaped, accepting the compensator as it deforms as depicted in FIGS. 12A-12C for mirror-image configurations. When the compensator is deformed such that it fully expands into the chamber's bowl, it is termed to have bottomed-out, that is, it has reached a maximum threshold.

Further embodiments with deformable membrane compensators comprise mirror-image-shaped compensators, arranged back-to-back. Sometimes referred to herein as a 'collapsible pancake' compensator device 1200, also referred to herein as a passive ballast module 1200, or simply a module 1200, is illustrated in FIG. 12A-C, where the passive ballast system comprises two surfaces 1224a and 1224b, each surface is a pressure-responsive compensator and the surfaces are on opposite sides of the system. Internal to each compensator are mirrored interior spaces 1206a and 1206b shown in FIG. 12A having uncompressed volumes, shown in FIG. 12B as spaces 1206a', 1206b' having partially compressed volumes, and in FIG. 12C as spaces 1206a", 1206b" having fully compressed volumes. The surrounding structure 1222a, 1222a' and 1222a" in FIGS. 12A-12C, respectively, is rigid, pressure resistant to external environmental pressure 104, FIG. 12B, and fluid-tight. The surrounding structure 1222a around the compensators is analogous to the chamber, but in the preferred embodiments is a single, unbroken piece with the compensator. Between spaces 1206a, 1206b is a section of the surrounding structure, a pressure-resistant internal wall 1234. The compensator is made responsive to ambient, external pressures most preferably by choice of materials during casting. In the preferred embodiments, the embodiment is produced by 3D-printing, allowing a single construction to have multiple properties to ambient pressures.

As the mirror shaped compensator passive ballast system is exposed to increasing pressure, compensator surfaces 1224a' and 1224b' deform into voids 1206a' and 1206b', respectively. Deformation decreases system buoyancy. Finally, as the system is exposed to more pressure than the deepest depth it is constructed to compensate for, the system is bottomed out, as compensator surfaces 1224a" and 1224b" come into contact with the internal wall of voids

1206a" and 1206b". As pressure increases, compensator surfaces 1224a, 1224b deform inward, and provide an adaptable volume between a maximum volume (no deformation, FIG. 12A) represented by line 1250a, FIG. 12E, and a minimum volume (bottomed out, FIG. 12C), represented by line 1250f. In between, the system provides a passive ballast system of changing volumes, represented by lines 1250b-1250e.

Some collapsible pancake embodiments further comprise multiple mirror-image ballast systems. Each system may be constructed out of the same material, or, preferably, at least a portion of the systems have different pressure-resistances (i.e. pressure at which the compensator begins to deform). The pressure-resistance of each system arises from material used, thicknesses, void sizes between compensators and the like. In further embodiments, a membrane or group of membranes are configured to bottom-out when exposed to different pressures, creating a system that varies as a function of pressure, as illustrated in FIG. 12F.

It is within the scope of the invention to have multiple passive ballast system within a single object. Each passive ballast system must be secured or otherwise incorporated onto the object, and therefore impact the object's volume (i.e. volume of liquid displaced when submerged). Placing systems with identical construction and properties on one object (e.g. an AUV) would increase the overall buoyancy change. Placing multiple systems, each with different properties (e.g. compensator resistances) gives the submerged object different buoyancy changes in response to different depth, temperature and salinity profiles, improving adaptability and fine tuning of the overall neutral buoyancy condition for the AUV.

It is commonly known that a given area of the ocean or other body of water will have a specific density profile, as illustrated in FIG. 12D and discussed in more detail in de Boyer Montégut et al. 2004. The density profile 1275 is dependent on is affected by depth, temperature and salinity in the water column. The density profile can be broken into layers, the surface mixed layer depth 1278, the barrier layer thickness 1279 and the thermocline 1280. Through a single profile the overall density 1275 changes as temperature 1276 and salinity 1277 change. The profile varies by local, season and sometimes time of day.

The inventive system provides a system that can be constructed to be interchanged before beginning a mission. Referred herein, multiple passive ballast systems adapted to be interchanged during a mission of an established vehicle are referred herein as passive ballast modules. In order to take advantage of embodiments with interchangeable passive ballast modules, a conductivity, temperature and density (CTD) profile can be taken of a target mission space. For example see FIG. 12D diamond, CTD profile from January 2012 in the Arabian Sea, and the vehicle, or submerged object can be fitted with passive ballast modules with the appropriate cumulative resistive properties for a specific mission within a given, approximate CTD profile (FIGS. 12D and 12F). In other words, a first module, or first set of modules are selected for resistive forces appropriate for a first profile section (e.g. between 0 and 40 m, represented by arrowed line 1281), a second set of modules are selected for a second profile section (between 40 m and 75 m, influenced heavily by salinity, arrowed line 1282), and a third set of modules are selected for a third profile section (between 75 m and 130 m, arrowed line 1283), producing a vehicle or object with adaptive buoyancy 1284 as it descends or ascends through the water column. The profile sections depend on the mission to be performed and from the local density profile; and can range from tens of meters and hundreds of meters. The division into profile sections depends on the submerged object's overall buoyancy and the degree to which a user wishes it to be close to neutral throughout each profile. A vehicle with such a system may be paired with a significantly smaller active, variable ballast system, due to its lowered positive buoyancy, saving in vehicle cost, complexity, power demand, and space used by its components.

Appropriate materials for deformable pancakes comprise different polymer plastics and metals, as known in the art. The shape of each embodiment may vary, but is often a disk-shaped embodiment. The size of a deformable pancake may vary as needed. Typically, it comprises a 10 centimetre diameter disk with a depth of 3 cm. The void center of the deformable pancake provides a system with a much higher compressibility ratio than that of the commonly used high viscosity silicone oil. Low viscosity silicone oil is known to have very high compressibility ratios, however it is a regulated hazardous substance, due to its low viscosity, and the present invention presents an effective alternative that is both safer and much lower mass contributor to the vehicle.

Density of sea-water and other liquid bodies varies based not only with pressure, but also with temperature and salinity. In some embodiments of the present system, the compensator comprising of deformable membranes utilizes membranes with materials whose net thermal expansion coefficients and bulk modulus to match the conditions of the liquid-body the system is deployed into.

Buoyancy Chamber

For incorporation into complex submersible vehicles, the present invention includes structure, referred to as a chamber, to contain the inventive system. Chamber 232, FIGS. 2B-2E, provides a defined, restricted internal space (a buoyancy chamber) that the compensator 224 is confined to and can be manipulated though by external pressure. The chamber provides a space located in the interior of the vehicle that is exposable to the external environment, without sacrificing vehicle fluid integrity. The external space above the buoyancy chamber 106c, 106d, FIGS. 2C-2D, is filled by environmental liquid as the vehicle descends through the liquid body, while providing a contiguous water-tight barrier of the vehicle, along with the vehicle's waterproof housing 701. The chamber is configured to house at least the compensator 224, and optionally, at least one retaining mechanism 228, and sensors or other optional components described elsewhere herein.

Because the compensator 224 creates a water-tight seal in the chamber, the chamber is adapted to be divided into two spaces. The chamber space between the compensator 224 and the chamber opening is referred to as either the anterior space or exterior space 108, and is configured to fill with external environmental liquid (i.e. fluid-fillable). The chamber space between the compensator and the inner wall opposite the chamber opening is excluded from the liquid environment (where liquid is displaced by the vehicle), and referred to as the posterior space, buoyancy chamber volume, internal space, or void 106. The internal space 106 may be filled by a compressible gas, compressible liquid, or by a vacuum. Movement of the compensator 224 results in a change of the ratio of internal to external spaces, changing the vehicles' overall volume, displacement, and therefore buoyancy.

In the currently preferred embodiment the interior of the chamber 232 is exposed to fluid from the external environment, but in some embodiments, the chamber is in contiguous fluid contact with an external reservoir 734 (e.g. a bladder), which in turn is exposed to the external environment. The chamber 232 may be constructed of any suitable material. Most often, it is constructed from the same or similar materials as the remainder of the vehicle. Most often it is made out of durable plastic, aluminium, steel, a titanium alloy and the like. The physical size, shape and volume of the chamber in any particular embodiment depends greatly on the size of the submersible vehicle it is incorporated into and the amount of positive buoyancy desired for the specific embodiment. The ballast system as described herein is scalable, from very small vehicles (e.g. roughly 3 inches in diameter) to much larger system (e.g. full sized submarines). It is understood that as the vehicle size increases, the passive ballast system is still useful, but size and power constraints are less.

Accordingly, the interior space 106 of the chamber may scale with the ballast system. And the exact size of the chamber depends on the required buoyancies of the vehicle in each specific embodiment. Typically the chamber represents approximately 5 to 10% of the vehicle's interior volume. In some embodiments, the system takes ups about 1%, 2.5%, 5%, 10%, 15%, 20%, 50% of the vehicle's interior volume. The chamber's volume defines the maximum buoyancy adjustment available to a user. As described below herein, the retaining mechanism and in some embodiments, the controllable opening, allows for further fine-tuning of buoyancy ranges.

Chamber Space Fillers

The present invention uses different chamber space fillers to allow a single sized system to provide different positive buoyancy ranges, each optimal for different situations or missions. The internal space 106 experiences compression as the system encounters increased ambient pressures. In some embodiments, the external space 108 contains a filler other than the external environment (e.g. embodiments with an external reservoir). The compressibility of each filler (also called compositions) determines the amount of buoyancy given to the system. Vacuum, air, defined gas mixtures, purified water, water-based solutions, mineral oil, and silicone fluids all have well defined compressibility characteristics. The degree of compressibility of these fillers further provides the innovative system with another level of buoyancy control. Selecting a more compressible posterior space filler gives the system less possible positive buoyancy. Selecting a less compressible posterior space filler gives the system more possible positive buoyancy. The reverse is true for the external reservoir. An external reservoir filled with a highly compressible composition results in more positive buoyancy. Almost all embodiments described herein are combinable with at least one of a posterior and an anterior space fill composition to achieve the desirable buoyancy ranges.

Retaining Mechanism

Because the compensator's movement between position z1 and z2 translates into a buoyancy change, it is desirable for many embodiments to restrain the compensator 224. The present invention provides for a retaining mechanism configured to restrain the space available to the compensator to travel or deform in response to the external pressure. The retaining mechanism comprises at least one retainer, which blocks the movement of the compensator. In some embodiments the retaining mechanism further comprises a tuner, allowing for the retainer to be repositioned, stopping the compensator at different positions.

As illustrated in the cross sections of FIGS. 2B-2E, one embodiment comprises two ring retainers 228, 230 connected to the interior of the chamber 232. The water-tight surface of the compensator 224 is configured to be positioned between the two rings, such that it cannot move outwards past the first ring nor move inwards past the second ring. The first ring 228 provides for a minimum position $x_1$ and the second ring 230 provides for a maximum position $x_2$ of the compensator 224, and therefore the min and max buoyancies available to the system.

In further embodiments, the retaining mechanism is defined by the physical manifestations of the chamber 232 and compensator 224, as illustrated in FIGS. 10A-C. For example in such an embodiment, the posterior wall of the chamber and the physical space taken up by the compensator 224 prevent further inward movement of the compensator 224 and thus establishes position $x_2$. For position $x_1$, the anterior wall of the chamber 232 blocks further outward movement of the compensator 224.

The retaining mechanism may comprise any restraining system as commonly known in the art. In some embodiments, the retainers utilize a magnetic stopper system whereby the retainer and compensator are magnetized and resist movement past one another.

Tuning Mechanism

In the currently preferred embodiment and as illustrated in FIGS. 8A and 8B, the system further comprises a tuning mechanism 838, which alters the position of at least one retainer 230. The tuning mechanism 838 enables the system to have a changeable target depth (depth of neutral buoyancy). In some embodiments, the tuning mechanism comprises an actuator mechanism (e.g. a motor) and a retainer mover (e.g. a driven shaft, for example a screw). The function of the tuning mechanism, or tuner, is to change the maximal and minimal positions available to the compensator, and therefore the corresponding amount of fluid-fillable space in the chamber; ultimately the minimal and maximum vehicle buoyancy.

In one embodiment, the tuner 838 comprises a stepper motor actuator and two leadscrews. The stepper motor, as known in the art, acts on the leadscrews in order to convert turning motion into linear motion, moving an attached retainer to the desired location within the system. In this embodiment, the $x_1$ position is fixed by a fixed-position retainer 828, while the turner 838 is configured to manipulate a second retainer 230 which forms the $x_2$ position.

It is to be understood that other possible embodiments may utilize a tuning mechanism to position the $x_1$ retaining mechanism; or two tuning mechanisms may be provided; a first tuning mechanism positions the $x_1$ retaining mechanism and a second turning mechanism positions the $x_2$ retaining mechanism. In further embodiments, the tuning mechanism comprises an actuator and an actuation mechanism listed in Table 1.

TABLE 1

| Actuation Mechanism |
| --- |
| Electromagnetic actuation |
| Gear Trains |
| Hydraulic actuation |
| Pneumatic actuation |
| Piezoelectric actuation |

In some embodiments, the turning mechanism 838 is set by an external user. In other embodiments, the tuner and matching retainers are machine-adjustable. In these embodiments a controller 740 is connected to the tuning actuator, allowing for external control (either autonomously from the controller, or a remote user by means of wireless communication relayed through the controller) of the inventive system.

External Reservoir Mechanism

The embodiments described herein can further comprise a fluid-tight, external reservoir mechanism 734. The main principle of the passive ballast system is that the compensator responds to the pressure of the external liquid environment, by way of hydrostatic pressure. The external pressure can be exerted onto the system in more than one way. First, as described above, by simple continuous fluid contact between the external environment and the compensator 224. Alternatively, external pressure can be placed on a deformable, fluid-tight container (e.g. a bladder), which is compressed and translates that pressure onto the compensator 224.

One embodiment further comprising an external reservoir 1034 is illustrated in FIGS. 10A-C. In this embodiment, a bladder is disposed partially externally to the vehicle's pressure housing 1001 and partially internally to the chamber 1032. The external portion of the container mechanism is exposed to the pressures of the external environment, and the internal portion is constrained by the chamber. The bladder 1034a, 1034b is also in pressure contact with the compensator 1024a, 1024b, respectively. As the vehicle is exposed to environments of higher pressure, the external reservoir 1034 is compressed, until its outward pressure matches the pressures exerted by the external environment. The increased pressures of the fluid-filled container 1034 places pressure onto the compensator 1024, resulting in similar transfer of pressure as experienced by embodiments that do not comprise an external reservoir.

Semi-Passive Ballast

Additional embodiments of the present invention have a passive ballast system that further comprises a sealable ballast chamber 332 and a controllable opening 336. Embodiments with such additions are referred to as semi-passive systems for simplicity. One semi-passive system is illustrated in FIG. 3 operates under a similar principle as the fully passive system, but with the addition of a controllable opening 336 (e.g. a valve) that can be opened or closed to "lock in" the vehicle at a particular buoyancy. This enables the submerged object (e.g. an AUV) to fine tune its buoyancy for varying oceanographic environments and possibly even anchor on the liquid-body floor. With a locked in buoyancy, the vehicle has full mobility through the water column at a constant buoyancy. In some embodiments, the semi-passive ballast systems are located in the forward section of an AUV to lift the nose out of the water while the tail remains submerged, allowing for lower profile GPS fixes and diving in reverse.

Semi-passive ballast systems comprise a sealable chamber 332, that provides all the features and abilities of the chamber as described above, while further enabling the dissociation of the external pressure and force applied to the compensator. The seal is formed by the controllable opening 336. The sealable chamber may be constructed in any manner suitable for accepting a controllable opening 336.

Controllable Opening

The semi-passive ballast embodiments of the present invention provides a controllable opening 336 that enables novel buoyancy control for a submerged object. The controllable opening 336 may comprise any adjustable opening as commonly known in the art. In the currently preferred embodiment, the controllable opening comprises a valve. The valve may be any type of suitable valve, for example a ball valve, a globe valve, a check valve, a butterfly valve or pinch valve.

The controllable opening 336 receives input from a controller 740, and automatic control is based on external input by controller 740 to a mover connected to controllable opening 336. In some embodiments, the mover is an actuator configured to act on both the controllable opening and the retainer. In other embodiments, the mover is an actuator separate from the tuning mechanism, and incorporated into the controllable opening 336.

The mechanism and method of operating the controllable opening may be any actuator or mover system as known in the art, including but not limited to an electric motor, a hydraulic actuator, a pneumatic actuator, a magnetic actuator, a thermal actuator, and a mechanical actuator (e.g. switch or rack and pinion). In some embodiments the mover comprises an electric motor that produces mechanical torque to act on the actuator targets. The mover is connected to and receives power from the power source.

Controller

The present invention further provides an optional on-board digital controlling device, referred to herein as a controller 740, FIG. 7A. The controller 740 provides control and data relay for the ballast system 720 and the vehicle 700. The controller 740 is most often located outside the system 720. Most often the control of the ballast systems is performed by the vehicle's main controller board, which may operate other components of the vehicle, as commonly known in the art. The controller is configured to give commands to the ballast system, and in some further embodiments, receive information on component statuses, as described below. The controller 740 may be any digital controlling device as commonly known in the art. Some embodiments of the present invention comprises a dedicated controller in the ballast system. In these embodiments, the dedicated controller has the same properties and abilities as described elsewhere herein for external controllers. The controller is connected to and receives power from the power source.

Controller Connections

It is understood that the controller 740 of the present disclosure will be attached to various components of the vehicle that may be present, and not discussed herein (e.g. sensors, samplers, navigation control fins, communication devices, etc.). In addition, and of interest to this disclosure, the controller 740 may be informationally connected to several components of the ballast system 720. In semi-passive ballast embodiments, the controller 740 is informationally connected to the controllable opening 336 and is configured to send commands to change its state (e.g. fully open or closed, or partially open).

Furthermore, in many of the preferred embodiments comprising a controller 740, various components of the ballast system are informationally connected to the controller 740 and are configured to relay information. The above-mentioned controllable opening 336 may report to the controller to its state (e.g. the position of the valve in degrees turn from a reference, relating to the allowable opening or state of openness). The biasing force, position, degree of stretch of the compensator 224 may be reported back to the controller 740. In some embodiments, pressure is measured in at least one of the anterior space 108, posterior space 106 and the ambient, external environment 102. Differences in pressure between the pressure sensors are used in conjugation with the known dimensions and characteristics of the system to measure the position and condition of the compensator 224.

A pressure sensor exposed to the external pressure would also function as a depth sensor.

In further embodiments, sensors capable of determining the state of the chamber 232 are present (e.g. a strip of water contact sensors in the side of the chamber). These sensors provide an independent report to the interconnected controller 740 on the amount of fluid in the chamber 232, and therefore the pressure of the exterior environment and proper working status of the compensator 224.

Some embodiments of the present invention comprise a temperature sensor located in close proximity to the ballast system 720, within the pressure housing 701 (i.e. in the internal space 705), such that it is not exposed to the external environment. The temperature sensor is connected to the controller 740 and enables the system to detect abnormal temperatures emanating from the ballast system, alerting the system to any faults. In further embodiments, the ballast system comprises a retaining mechanism position sensor. It is understood that the embodiments containing the interconnected components described herein are not mutually exclusive.

Dynamic Water Density

Figure 11:
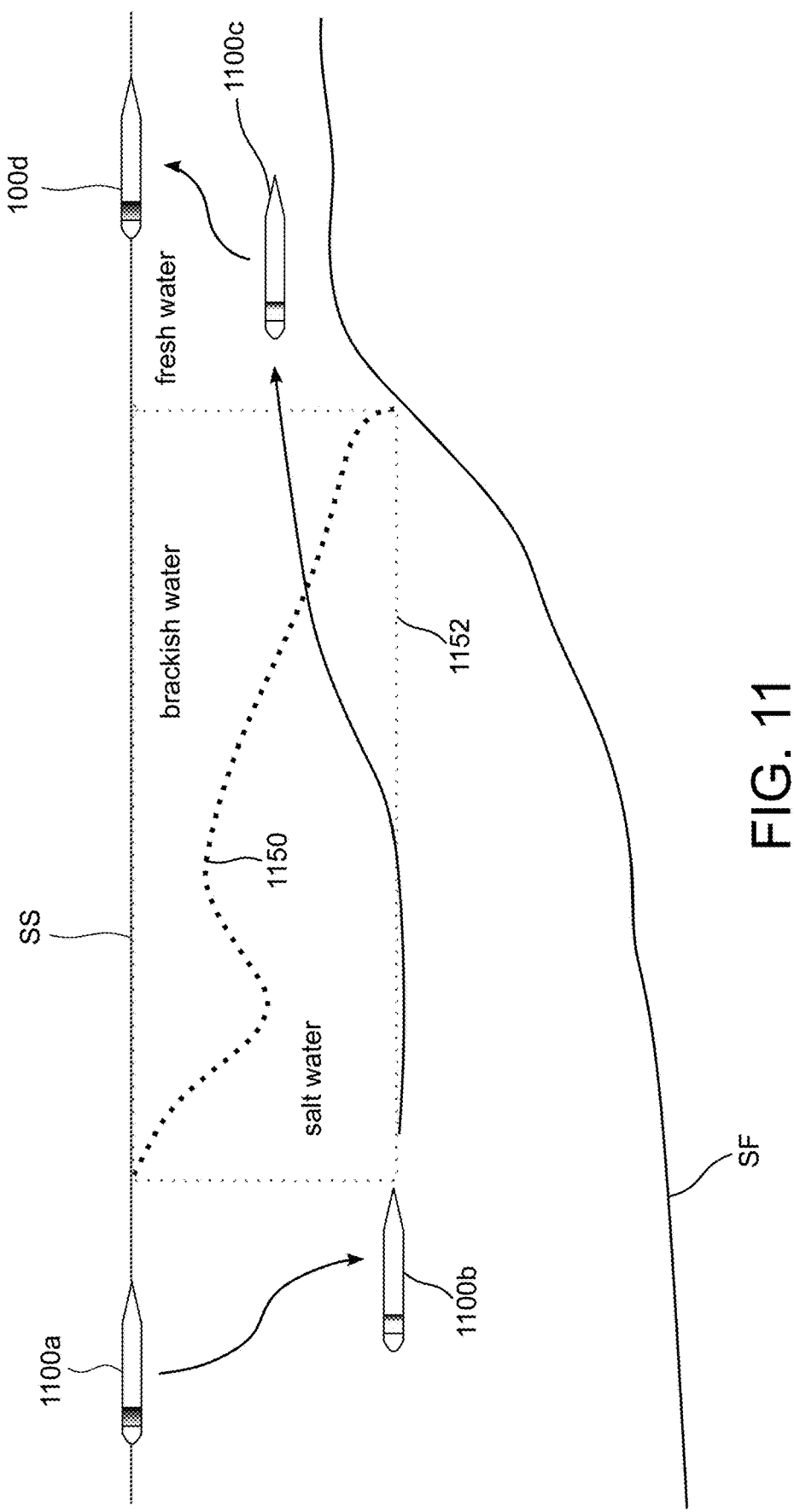
FIG. 11 illustrates one embodiment of the system comprising both active and passive ballast systems, for use in dynamic liquid density environments.

Large scale changes in temperature and salinity between fresh and salt water can effect vehicle ballast by as much as 3%. This can result in vehicle stability issues, inability to penetrate haloclines, inability to dive from the surface or, the worst case event, the inability to return to the surface. The present invention allows for incorporation of an active ballast system along with the passive ballast system, as illustrated in FIG. 11. By controlling the vehicles specific weight with an active ballast system that accounts for at least 3% of the vehicle displacement, the vehicle will remain neutral or become positively buoyant in a wide range of water densities characterized by fresh, brackish or sea water.

If it is assumed that fresh water will be present only in the near-shore shallow environment then liberties can be taken with the design of an active ballast system. If large dynamic ballast changes need only be made at relatively shallow depths than the complexity of design and cost of components can be reduced while creating a robust system that is faster to react than current systems which assume ballast changes will be needed up to maximum vehicle operating depths. For example, brackish water areas change temporally depending on the tides, and after increased river outflow. Thus the water profile of a given area (in this case, horizontal area, not vertical as elsewhere herein), can change salinity (see line 1150, FIG. 11).

Housing

The ballast system is incorporated in a submersible object such as a platform or a vehicle. In the majority of embodiments, the submersible object itself provides a waterproof, pressure-proof housing such as housing 701, such shown in FIG. 7A as a schematic side cross-sectional view of an AUV carrying a passive ballast system according to the present invention affixed in a fluid-flooded fore compartment 703. The housing 701 prevents the external environment from flooding into the object's internal areas 705. In these embodiments the housing is required to be pressure resistant to the external liquid environment. Therefore, in these embodiments, only the compensator 224, or external reservoir 1034a, FIG. 10A, and the object's housing 701, FIG. 7A, must be resistant to pressures from the outside environment. The object's internal area 705 (dry, fluid-tight area, as commonly known) optionally comprise additional passive ballast system 700 components, such as controller 740 and power source 742. The passive ballast system may reside in the object's internal area 705, with a connection to the liquid environment (e.g. the compensator filling a hole in the object's wall), or in a compartment 703 exposed to the liquid environment.

While the ballast system is defined at least as a chamber 122 and a compensator 124, the system must be exposed to the pressure from the external, liquid environment. In all embodiments the ballast system is in fluid contact with a medium exposed to the external environment.

In the currently preferred embodiments, the ballast system is exposed to the external pressure through a small area that transfers pressure through the housing 701, allowing the external environment or its pressure into the ballast chamber 232, but not into the submersible object's internal space 705. In other embodiments, the ballast system is only in fluid contact with an external reservoir 103 (e.g. a fluid-filled, fluid-tight bladder). In these embodiments, the external reservoir is connected to chamber 1032, passing through housing 1001, allowing for the transfer of ambient external pressure to compensator 1024a.

In other embodiments, the chamber and housing are interchangeable. In these cases, the housing serves the functions of the chamber, and no separate chamber is present.

Drag Formulas:

The total drag on an AUV is due to a combination of the form drag of the streamlined body and the appendage drag from fins, antennas, transducers, and other sensors. While the relative contributions vary between vehicles with different configurations, a reasonable estimate is that form drag accounts for a quarter of the total drag.

$$D_{total} = D_{form} + D_{appendage} \quad \text{(EQ. D)}$$

Where $D_{form}$ is responsible for approximately 25% and $D_{appendage}$ is responsible for approximately 75% of drag on the AUV.

The form drag will change based on the pitch ø of the AUV. In the extreme case of 90 degrees pitch, the vehicle body can be approximated as a cylinder in cross flow, which has 10 times more drag as a similarly sized streamlined body. Using this relationship, we can parameterize the additional form drag due to pitch $$D_{form} + D_{pitch} = (1 - \sin\emptyset)D_{form} + 10\sin\emptyset D_{form} \quad \text{(EQ. E)}$$

and $$\frac{D_{pitch}}{D_{form}} = 9\sin\emptyset \quad \text{(EQ. F)}$$

For small pitch angles, this equates to approximately 16% additional form drag or 4% additional total drag per degree of pitch. This latter percentage will be greater for more streamlined vehicles, and they have a direct adverse effect on the range and endurance of the AUV. For a REMUS 600 vehicle with nominal 3 days of endurance, the ability to be neutrally buoyant without a few degrees of pitch could extend the endurance by over 7 hours.

Spring and Pressure Formulas:

The force on an ideal spring is equal to the spring constant k times the displacement value x:

$$F = kx \quad \text{(EQ. G)}$$

Drag Formulas: The hydrostatic pressure at depth z is proportional to the fluid density p and the acceleration due to gravity g:

$$P = pgz \quad \text{(EQ. H)}$$

Since force is pressure over area, the hydrostatic and spring effects can be balanced across the cross-sectional area A of a passive ballast system:

$$kx = pgzA \quad \text{(EQ. I)}$$

If the spring is physically constrained to only move between displacements $x_1$ and $x_2$, shown in FIG. 2, we can derive the passive ballast displacement as a function of depth.

$$x = \begin{cases} x_1, & z \leq z_1 \\ \dfrac{pgzA}{k}, & z_1 < z < z_2 \\ x_2, & z \geq z_2 \end{cases} \quad \text{(EQ. J)}$$

The dimensions of the passive ballast system according to the present invention and the choice of spring can be designed according to the desired depths of operation. Typically, REMUS vehicles are ballasted to have positive buoyancy amounting to around 1% of their weight. For a REMUS 600 vehicle, this could be achieved with a passive ballast volume equivalent to a 14 cm cube.

Propulsion:

The present invention is a low-cost, low-power consuming modular device that can be constructed onto almost any submerged object. To transition from positive buoyancy at the first depth (e.g. the surface) to neutral buoyancy at a second depth, most embodiments will utilize the vehicle's propulsion system 750. Any suitable propulsion system may be used, as commonly known in the art. However, in the case of low power-consuming vehicles, a highly efficient, and simple propulsion system is preferred. Two such systems are described in U.S. Pat. No. 9,873,499 and 10,106,237 and are incorporated herein by reference. U.S. Pat. No. 9,873,499 discloses a propulsion system that produces differential velocity about the turning arc of a propeller, resulting in non-symmetrical trust, and therefore a turning moment. This turning moment allow a vehicle equipped with such a propulsion system to turn without the additional requirement of rudders or other turning equipment, reducing power consumption, component drag and vehicle complexity. U.S. Pat. No. 10,106,237 describes a highly efficient electrical motor suitable for submerged vehicles, and so is especially well suited for combination with the current invention.

Power Source

The present invention reduces the system's power demand by providing a neutral buoyancy at the desired depth, thus removing the need to continuously use a propulsion system to maintain depth. The vehicle's power source 742 may be provided by any means as commonly known in the art, such as a battery or a generator (gas, diesel, solar-, wave-powered, thermal, etc.). The power source is connected such that it supplies power to suitable components on the vehicle, as needed. In some embodiments, the power source 742 is connected to the controller 40, tuning mechanism 838, actuators, and any optional sensors. In some embodiments the passive ballast system comprises a dedicated power source 742. In other embodiments, the present invention is interconnected to and receives power from the vehicle's power source. In further embodiments, the passive ballast system comprises a power source and is also interconnected to the vehicle's power source.

Navigation:

The invention disclosed herein demonstrates a new device allowing for lower power-consumption and less complexity of a submerged vehicle, especially small autonomous vehicles. While the present invention is suitable for submerged vehicles of practically any size, in the case small AUVs, a smaller price tag also comes with a dramatic reduction in the vehicles' navigational capabilities, as compared with expensive, power-hungry and large, state of the art inertial navigation systems. Therefore, the present invention discloses an innovative, cheap to implement navigation system and methods using a single transponder and off-the-shelf vehicle components.

The present navigation system and method utilizes the optimal spiral path geometry for areal search missions while keeping the total cost of the required on-board sensors to a minimum. This innovative approach is highly scalable to large numbers of submerged vehicles that would be capable of surveying vast areas of seafloor in dramatically less time and with lower risk than the more complex submerged vehicles currently available, and it could open up new markets in local law enforcement or search and rescue teams as well.

Autonomous underwater vehicles (AUVs) provide a robust platform for carrying a wide variety of sensors to anywhere in the ocean with incredible precision. The prevailing paradigm throughout their development has been to create versatile "workhorse" vehicles with state-of-the-art navigation systems that can then be outfitted with any obtainable sensor and programmed to perform any imaginable mission. While this versatility has been a boon to their widespread acceptance in the academic, commercial, and military communities, it comes with a price tag ($100Ks-$1Ms) that is prohibitively high for many interested parties. To meet this growing market demand, companies such as OceanServer, Bluefin Robotics, and Riptide AS have been developing small "low-cost" (low-cost defined as ten to thirty thousand dollars) AUVs. However, these vehicles must be outfitted with navigation and mapping sensors required to perform any useful real-world missions. And once outfitted, these vehicles cease to be a low-cost systems.

The present invention discloses a system describe herein above and a method to utilized the described propulsion system, and low-cost and low-power ballast system to transform the above low cost vehicles to new, highly useful submerged systems. The novel navigation system is referred to as search pattern integrating radial acoustic localizations (referred to as simply, SPIRAL, or SPIRAL search) for the purposes of this disclosure. SPIRAL search consists of a single transponder in the center of the survey area that is interrogated by a vehicle maneuvering along a spiraling pattern, simultaneously optimizing both its position estimation abilities and its areal coverage rate. The transponder utilized in this invention may include any standard submerged transponder as known in the art, for example an ultra-short baseline (USBL) acoustic transponder. This system represents a dramatic simplification in the infrastructure required to exhaustively map a patch of the seafloor with absolute position accuracy, moving the paradigm of low-cost AUV systems closer towards a practical reality.

While single transponder navigation is a well-studied field, its utility has been limited in practice by the vehicle path geometries required for good results as well as by the obvious advantages of simply deploying a second transponder to triangulate position at any instant using long baseline (LBL) techniques. However, the spiraling pattern we propose is in fact an ideal geometry for single transponder navigation, shown in FIG. 4, and is analogous to the search patterns typically used by divers. A more subtle advantage is that the navigation solution can be computed in polar R-θ coordinates relative to the transponder rather than traditional Cartesian X-Y coordinates. The radial range, R, does not need to be estimated because it is measured directly. In further embodiments, the vehicle itself deploys an expendable transponder, survey in the transponder using its own GPS, or home in to the transponder and dock to its mooring line for recovery; these already exist as mature technologies as known in the art alongside ongoing work in low-cost AUV propulsions systems.

One embodiment utilizes a REMUS 100 vehicle equipped with an inertial navigation system. Deployed alongside traditional LBL transponders, this setup allows direct comparison of the present invention with the state of the art in AUV navigation as well as with a reliable ground truth measurement. Another cost-saving concept we will test is the use of the side-scan sonar's first returns to measure altitude, which can be compared to the altitudes directly measured by the vehicle's other sensors. This overall approach represents a low-risk proof of concept that leverages existing AUV infrastructure at very low material costs.

Side-Scan Sonar Mosaics:

Although this invention is mainly focused on navigation, we also cannot ignore how vehicle behavior might affect the ability to collect useful data. Side-scan sonar is a logical choice for demonstrating the ability of our system to exhaustively search an area of the seafloor using our proposed navigation strategy. Furthermore, costs could be cut in half by only equipping the AUV with a single side-scan sonar channel, rather than the traditional port and starboard pair. FIGS. 5A-5D illustrate the comparison of a traditional mow-the-lawn type side-scan survey, FIGS. 5A and 5C, with the proposed SPIRAL search approach, FIGS. 5B and 5D, noting several advantages and opportunities associated with the latter. While ranges to the transponder are measured continuously, uncertainty in the heading and along-track estimates will induce errors in the map both along-track and between tracks. However, even in the presence of significant errors and the absence of good navigational data, impressive mosaic results have been demonstrated. Furthermore, if there is sufficient overlap between spiraling pattern 416, FIGS. 5B and 6B, feature-based methods can be used to recover bathymetry from multiple looks at the same area.

The present system of a low-cost, low-power passive ballast system and SPIRAL search navigation lowers the "price per data point" for search and survey AUV missions by offering an inexpensive solution to the problem of accurate GPS-less navigation underwater. This approach scales from a single cheap shallow vehicle, which an undergraduate student might use to repeatedly map sand ripples around a permanent transponder mooring over periods of days to months, to a fleet of aircraft-deployed deeper vehicles capable of searching vast swaths of seafloor for a downed airline in a fraction of the time for a fraction of the cost, illustrated in FIGS. 6A-6E. This innovative approach holds promise to make true low-cost AUVs a viable reality as both an indispensable research platform for marine scientists as well as a classroom tool to inspire the next generation of robotics engineers and oceanographers.

Figure 9:
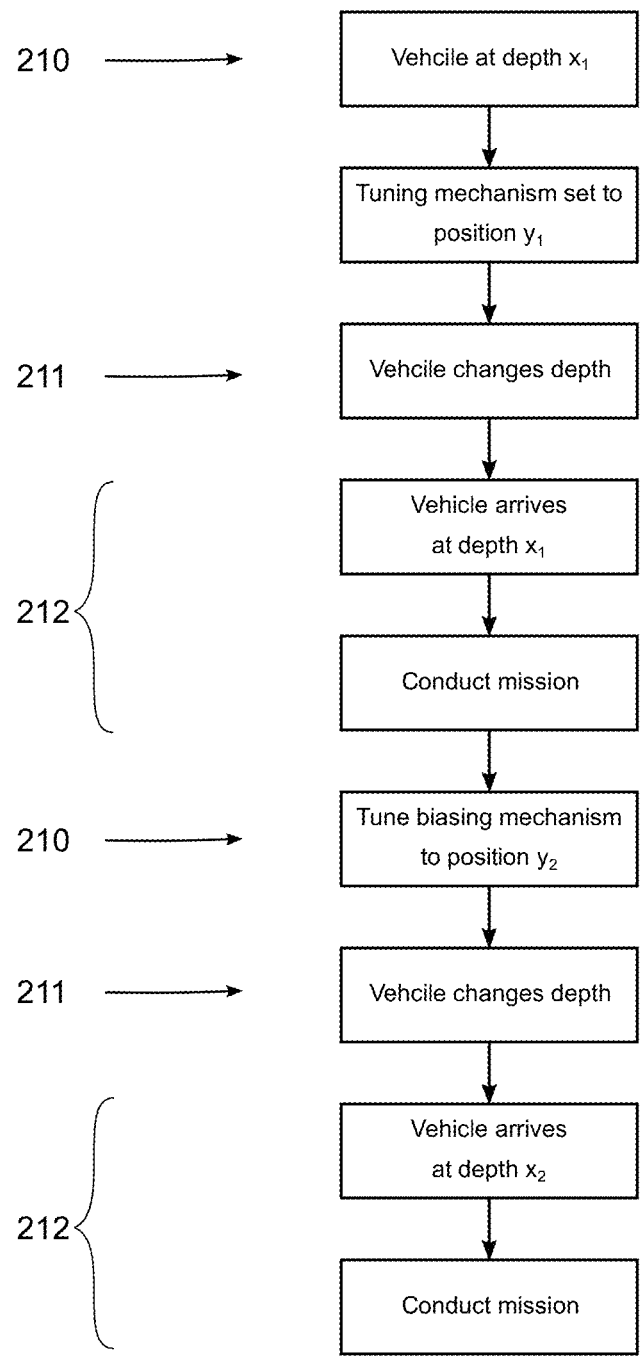
FIG. 9 is a flow chart of ballast adjustment according to the present invention.

FIG. 9 is a flow chart of ballast adjustment according to the present invention. During deployment, the vehicle can be set by a user to be positively buoyant, usually fine-tuned to an exact positive buoyancy. The vehicle is deployed at depth $x_1$, often at the surface, although vehicles with this system can be deployed at different depths (e.g. from a submarine). Optionally, the tuning mechanism can be changed by a user, ideally by remote control after deployment. Changing the tuning mechanism adjusts, in real time, the target depth of the system ($x_2$). Position $y_1$ of the tuning mechanism represents the setting or location on said mechanism that blocks the compensator. The vehicle then dives, using either its propulsion system or other propulsive force (e.g. drop weights). Once reaching depth $x_2$, the vehicle shuts off its propulsion (or drops the drops weights) and is now neutrally buoyant. Because it is neutrally buoyant, the vehicle does not need to expend extra energy remaining at depth, and can conduct its mission without expending energy remaining at one depth.

The user may decide to return to positive buoyancy, towards $x_1$ (e.g. the surface) at this time, or may change the turning mechanism to a new position, $y_2$. Again, using the vehicle's propulsive force, the vehicle changes depths to $x_3$, where it is now neutrally buoyant and again can conduct operations without expending energy maintaining a constant depth. After mission completion, the vehicle may return to $x_1$, or do further changing of its tuning mechanism.

FIGS. 10A-C are schematic side, partial cross-sectional views of three possible states of one embodiment of the semi-passive ballast system further comprising an external reservoir shown in an expanded condition 1034a, FIG. 10A, and a contracted condition 1034b, FIGS. 10B-10C, with FIG. 10A illustrating the system when the vehicle is positively buoyant with the compensator 1024a near the chamber anterior side, and the majority of the chamber is void space 1006a. Before closing the controllable opening 1036a, also referred to as valve 1036a, FIG. 10A, the system is disposed in an ambient pressure too low to compress the external reservoir 1034a, and therefore compensator 1024a, which is interconnected by the controllable opening 1036a, when open, through the vehicles' hull 1022. The valve 1036a is closed and the vehicle may change depth, without changing its buoyancy.

FIG. 10B illustrates the system when it experiences hydrostatic pressure, from the liquid environment and controllable opening 1036b is in an at least partially open state, driving the working fluid of the external reservoir 1034b through the open controllable opening 1036b and against the compensator 1024b. The transferred hydrostatic pressure results in the compensator 1024b to transition into the chamber 1032, expanding the chamber fluid-filled volume of second space 1008b while reducing the volume of first space 1006b, thereby decreasing the vehicle's buoyancy.

FIG. 10C illustrates the system when the controllable opening is transitioned to a closed state while the compensator 1024b is depressed, giving the vehicle a set buoyancy. In this state, the set buoyancy of the vehicle will not change in response to any depth changes made by the vehicle. Opening of the controllable opening 1036c will result in the vehicle changing buoyancy to the current, ambient pressure.

Example 1

One specific embodiment of the instant invention is described herein and illustrated in FIGS. 13A-13E. This embodiment of the present invention is referred to as the Auto Ballaster 1300, and the system is self-contained within a pressure housing 1322 reversibly attached to another vehicle, in this case a RAFOS float commercially available from Seascan. The Auto Ballaster may be reversibly connected to the RAFOS float by any commonly known attachment mechanism 1348, some of which are described in US Patent Application Pub. Nos. US 2018/0082166 by Kukulya et al. and US 2017/0332612 by Partan et al., incorporated by reference herein. One suitable attachment mechanism 1348 comprises a screw attachment to the RAFOS float burn-wire system.

The Auto Ballaster is a semi-passive ballast system, comprising the key components of a controller 1340, a depth sensor 1344, a chamber 1332 and integrated compensator, and a valve 1336 in fluid communication with an opening 1337, shown in FIG. 13E near a protruding electrical connector, with opening 1337 extending through an external end plate which sealably engages external cylindrical housing portion 1301. The Auto Ballaster allows a user to instruct the controller 1340 to bring the system and attached vehicle to a specified depth, or depths and is designed to be attached to any suitable submersible object or vehicle. Vehicles especially suited for the Auto Ballaster include floats or other objects that maintain a specific depth for long periods of time (e.g. RAFOS floats).

The incorporated controller 1340 is instructed to bring the system to a specific depth in the ocean. Using the interconnected depth sensor 1344, the controller 1340 opens and closes valve 1336 through opening 1337, allowing the ambient pressure from the external liquid environment to force water flow into the chamber 1332. The chamber volume is formed by the chamber and the compensator, and is expandable, in response to the pressure from the fluid environment. In the preferred embodiment, the chamber interior is held at a vacuum at the time of deployment, and any entry of water from the external environment results in an overall mass and density increase of the system, reducing buoyancy.

Controller 1340 repeatedly opens and closes valve 1336, while measuring system position from depth sensor 1334. Typically, the valve 1336 is opened at least 0.5 milliseconds (ms). The opening time depends on the depth of the system. As the system descends, the ambient pressure increases, increasing the flow rate of water through opening 1337 and into chamber 1332. Therefore, controller 1340 adjusts the open state period of valve 1336 according to depth. Typically valve 1336 is opened from 0.1 ms to 10 ms periods. Once the system has achieved the desired depth, controller 1340 ceases to open valve 1336, and thus establishing a stable depth of the system.

The Auto Ballaster is scalable with the desired buoyancy changes needed for the overall system and attached vehicle. Typically, for neutrally buoyant (at the surface) RAFOS floats, an Auto Ballaster's chamber will be within 0.5 L to 1.5 L capacity, resulting in 0.52 kg to 1.55 kg mass capacity (seawater having a density of approximately 1.03 kg/L). One gram of increased mass typically results in a 30 m buoyancy change for RAFOS floats, therefore the system provides a wide range of available target depths.

In some cases, the Auto Ballaster enters sleep mode upon reaching the target depth. The Auto Ballaster may be programmed to wait a specific amount of time and then repeat the above process to decrease buoyancy to a second, deeper depth. In other cases, the Auto Ballaster may sever the connections to valve 1336 upon reaching target depth; therefore preventing any erroneous operation of the valve. It is within the scope of the present invention for the Auto Ballaster to further comprise an underwater communications mechanism, interconnected to the controller to exchange information and commands. A system with a communications mechanism is further programmable to new target depths during deployment. Suitable communication systems include those disclosed in U.S. Pat. Nos. 7,953,326 and 9,231,708 by Farr et al., U.S. Pat. No. 8,953,544 by Machado et al., and U.S. Patent Application Pub. No. 2016/0127042 by Farr et al., for example.

In its simplest form, the Auto Ballaster is sacrificial, and is configured to bring the attached vehicle to consecutively deeper depths. Additional depths are achieved by the controller opening the valve in response to a command, most often after a prescribed time period. Once the predetermined time has elapsed, the Auto Ballaster is separated from the vehicle (scarified as a drop weight), and the previously attached vehicle ascends through the water to the surface, for data transmission and recovery. Most often the Auto Ballaster is attached to the vehicle by a burn wire, and either the vehicle, or the Auto Ballaster may initiate the command to activate the burn wire.

Electrical power is provided by a power source. The power requirements of the Auto Ballaster are minimal, and may be provided by two off the shelf 9V batteries. Any other power source as commonly known may be suitable.

In one construction of the Auto Ballaster, the depth sensor is a 628-10-GH-P1-E1-51 pressure transducer from Dwyer Instruments. The connection between opening and chamber is ⅛ inch outer diameter, 0.028 inch internal diameter stainless steel tubing SS-T2-S-028 from SWAELOK. The pressure housing 1302 may be constructed out of any suitable material known in the art, as long as it resistant to pressure, water and corrosion over long periods.

Example 2

Underwater Robotic vehicles are typically 2 to 5 times less compressible than seawater. This means they become more buoyant the deeper they go. Maintaining depth therefore requires expending energy. In principle it is possible to make a vehicle with an overall compressibility (bulk modulus) roughly that of a specific depth profile of a liquid (typically seawater). Such a compressible vehicle, if ballasted properly to be neutrally buoyant at the liquid surface, would require little to no energy to hold a depth. In common practice, vehicles are deliberately made to be either positively or negatively buoyant, depending on the use or mission. However, a compressibility-matched vehicle (e.g. a passive ballast system), would expend roughly the same energy to hold depth near the surface as it would at deep depths while maintaining the same ballast condition.

Seawater and other complex liquid bodies have variable density throughout a vertical depth profile. And density varies not only with pressure, but also temperature and salinity. Seawater compressibility itself is a function of pressure, temperature, and salinity. A near-ideal passive ballast compensation scheme would yield a vehicle with a net thermal expansion coefficient and bulk modulus match that of the ambient seawater density profile. The match to the profile is critical and novel, as common practice only attempts to match one particular same, depth, or small volume of seawater. Density profiles vary. The near ideal compensator therefore has tunable parameters that respond to the ambient pressure of the local seawater. These parameters include bulk modulus, pressure resistance and material effective thermal expansion coefficient.

The value of compressibility-matching is recognized and used to vary degrees in low power oceanographic vehicles, especially AUGs. The Deepglider AUG employs "compresses" that are bulk volumes of liquids that are each more compressible than seawater (e.g. some silicone oils). Despite a conventional stiff hull, the next compressibility of the Deepglider roughly matches that of seawater. However, AUGs never hold a depth, but instead compressibility matching reduces the work their buoyancy engines must do to achieve a desired glide speed. An incompressible glider would slow down as it went deeper, thereby requiring additional displacement to maintain speed. This method results in only an approximate constant bulk modulus, and are therefore not the ideal compensation scheme, as defined herein.

High-power vehicles typically adopt a different approach, suing active, variable ballast (VB) systems to alter their displacement and thereby achieving a desired ballast condition. VB systems are energetically expensive and challenging to design problems for high pressure and large volumes.

In this specific embodiment of the present invention, an elastic structure with an internal void is proposed, that suitably designed will yield arbitrary effective bulk modulus until complete collapse of the internal void. After collapse, the passive ballast module behaves as a bulk material. One example of this is illustrated in FIGS. 12A-12F. Also referred to herein as a "collapsible pancake," this passive ballast module 1200 consists of two mirror-image voids 1206a, 1206b covered by a relatively thin membranes 1224a, 1224b arranged back-to-back.

As ambient pressure increases, the membranes 1224a, 1224b deform towards the bowl-shaped middle section 1223 (FIG. 12B), eventually bottoming-out (FIG. 12C). Preliminary calculations indicate small bulk moduli (relative to the material containing the void) are possible without resulting in structural deformation. These collapsible pancakes could be produced inexpensively in quantities (preferably 10 to 100, or to several hundreds). Additionally, these passive ballast modules 1200, FIGS. 12A-12C, can be constructed with different membrane thicknesses, different materials (including some metals), using modern 3D printing techniques. Various effective bulk moduli could be created by combining different passive ballast modules 1200. By combining passive ballast modules 1200 that bottom out at different pressures, it would be possible to make the effective bulk modulus 1200 vary as a function of pressure (see FIG. 12F).

With prior knowledge of a chosen vehicle's intrinsic compressibility and buoyancy, it would be possible to collect a local CTD profile, enter the profile data into a computing system with an inventory of available passive ballast modules 1200, and determine an optimal mix of modules to add to the vehicle. To avoid altering the surface ballast condition, a certain amount of syntactic foam floatation or weight ballast (e.g. lead or steel) could also be added to the vehicle. In practice, most passive ballast modules 1200 could stay attached to the vehicle to compensate for the dominant bulk modulus mismatch between archetypal seawater and the vehicle, with a small fraction altered according to profile.

The exemplified collapsible passive ballast modules do not seek to directly affect thermal expansion coefficient, it is possible to compensate for ambient density variations primarily due to temperature (especially at near-surface depths, e.g. less than 300 m, less than 100 m, and less than 30 m). Vertical stratifications of the ocean implies temperature can be interpreted as a function of depth and hence of pressure. For example, a strong vertical temperature gradient from warm and shallow to deep and cold results in a larger buoyancy gain than in the isothermal case. From the perspective of vehicle ballast condition, this is no different than the background seawater having an effectively smaller bulk modulus. Therefore passive ballast modules could be used in the same way (after taking into account their thermal properties and those of the vehicle).

Example 3 Passive Variable Ballast System

Figure 14A:
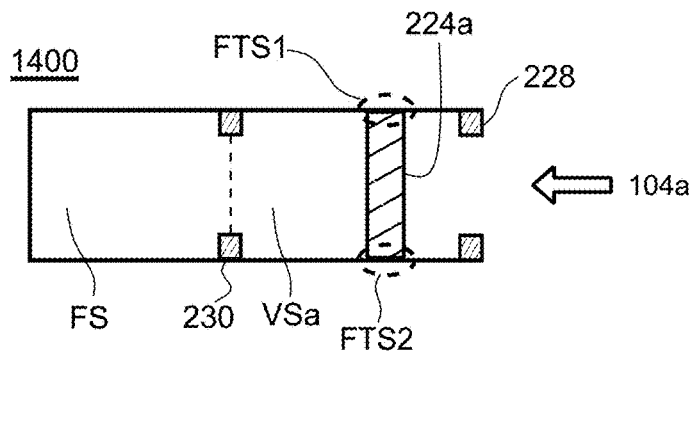
FIG. 14A-C illustrate one example of a variable passive ballast embodiment of the present invention similar to the embodiment shown in FIGS. 2B-2E, utilizing a chamber divided by stops into a fixed section and a variable section, enabling a simple, robust and low-cost passive ballast system that is specifically tuned to operate within a narrow depth range.
Figure 14C:
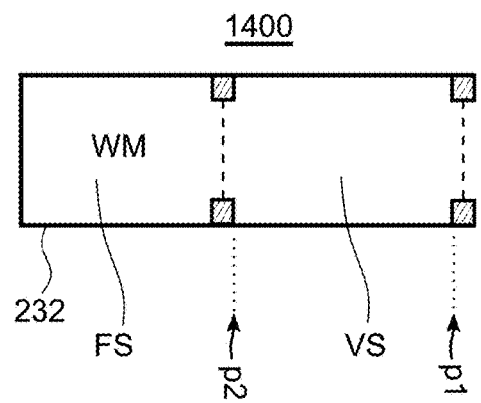
Figure 14B:
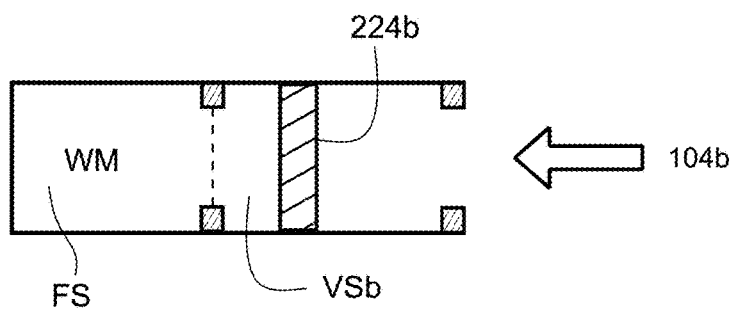

Another specific embodiment of the instant invention is described herein and illustrated in FIGS. 14A-14C. This embodiment of the present invention is referred to as Passive Variable Ballast (PVB) System 1400a. The PVB is a modification of the passive ballast system described above, comprising a compensator 224 (e.g. a piston), a chamber 232, at least one stop 230, and a working medium WM (e.g. a compressible gas) disposed in, and in almost all cases, filling (i.e. expanding to fill) chamber 232. The chamber 232 is further divided into at least two sections, divided by the stops 230 into a fixed section FS and a variable section VS. Fixed section FS and variable section VS sections are separated physically by stops 230 insomuch as the compensator 224 may not move into the fixed section FS section. The two sections are connected such that the working medium WM inside chamber 232 may expand into both sections. As disclosed elsewhere herein, compensator 224 forms a fluid-tight and gas-tight seal with chamber 232. The seal is produced where the compensator 224 interacts with chamber 232 denoted by dashed circles FTS1 and FTS2 in FIG. 14B.

As illustrated in FIG. 14A, the external environment exerts a pressure 104a onto the compensator 224a, establishing a volume in the variable section VSa when the attached vehicle is at a first depth (and therefore a first pressure). When the vehicle moves to a second pressure, the compensator 224b is affected by the new external pressure 104b exerted onto compensator 224b. This new, larger pressure (and therefore deeper depth), illustrated as a larger arrow in FIG. 14B, affects the compensator 224b into the chamber 232, compressing the variable section VSb, shrinking the volume of the combined fixed section FS plus the variable section VS.

Net displacement of system 1400 (and therefore vehicle overall buoyancy) may be controlled by adjusting location of stops 230 along the length of chamber 232 and thereby changing the ratio between fixed section FS and variable section VS. The fixed section FS enables for compression of the variable section VS section at lower external pressures 104. The desired operating range of the system 1400 as well as the desired buoyancy change both inform the sizing of the fixed section FS and the variable section VS of the system 1400.

Figure 14D:
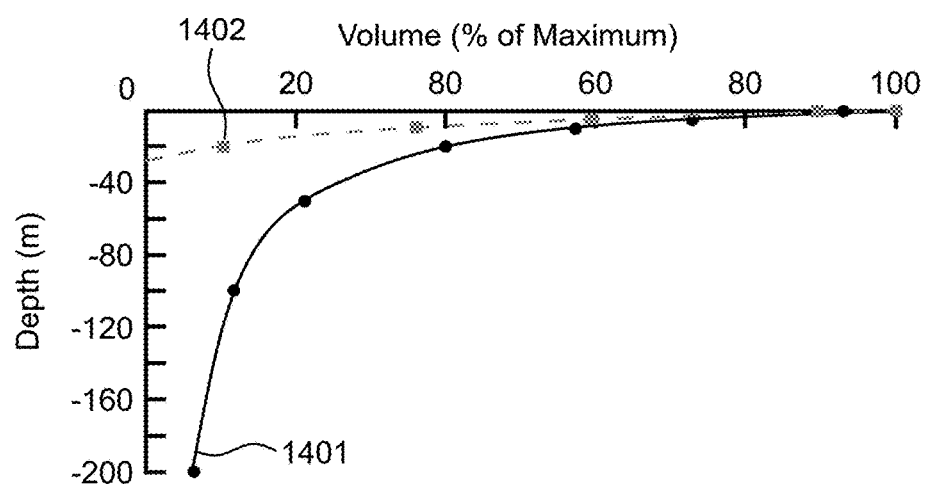
FIG. 14D illustrates the buoyancy change as a function of depth of two embodiments of the present invention.

In a closed system at constant temperature, the pressure of a constant amount of an ideal gas (i.e. the working medium WM) can be assumed to be inversely proportional to the volume it occupies. As pressure increases, the volume will decrease. As pressure decreases, the volume will increase. This relationship can be expressed by the equation $P1 \cdot V1 = P2 \cdot V2$. This equation can be used to crudely predict the behavior of a simple Passive Variable Ballast system 1400 that utilizes an ideal or compressible gas as the working medium WM. FIG. 14D illustrates the relationship between pressure and volume for a fixed quantity of an ideal gas at constant temperature. Pressure, and therefore depth, is plotted on the y-axis, and volume is plotted on the x-axis as a percentage of volume total. The total volume represents the volume of internal space 106 for line 1401 and the sum of fixed section FS and variable section VS as in system 1400 for line 1402. In embodiments for which the entire volume can be compressed (e.g. system 100), the internal pressure of the gas will almost always be equal to the external pressure of the system and results in the graphed solid black line 1401. In this case the internal volume of the system 100 decreases rapidly at first but this rate of compression slows as the volume of the working medium WM (e.g. a compressible gas) is reduced. This means that the buoyancy of the system 100 will vary more dramatically through shallower depths and less dramatically at deeper depths, as pressure increases. This presents a control issue, particularly for embodiments designed to operate at shallower depths.

In the case of an embodiment with both a variable section VS with an associated fixed section FS, the rate of compression will not drop off as steeply before the variable section is fully compressed, as graphed with dashed grey line 1402. At this point a pressure differential will occur as the external pressure 104 increases and the internal pressure remains at the threshold required to fully compress the variable section VS. By using the combined gas law, temperature can be taken into accounted as well. The system 1400 specifications can then be determined based on the desired buoyancy change and the desired depth rage for operation. Additionally, the initial internal pressure of the system 1400 can be increased above one atmosphere to adjust the rage of actuation (i.e. compensator 224 movement in response to external pressure 104) and ensure that the maximum desired volume will be expressed at the surface regardless of operational temperature.

Although specific features of the present invention are shown in some drawings and not in others, this is for convenience only, as each feature may be combined with any or all of the other features in accordance with the invention. While there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

Other embodiments will occur to those skilled in the art based on the present disclosure.

It is the intention, therefore, to be limited only as indicated by the scope of the claims appended hereto. Other embodiments will occur to those skilled in the art and are within the following claims.

What is claimed is:

1. A passive ballast device, configured for use with a submersible vehicle in a liquid environment, comprising:
    a chamber having at least one rigid wall to define at least a portion of a chamber volume;
    a passively movable compensator having at least first and second surfaces, the first surface configured to be exposed to the liquid environment, the second surface excluded from the liquid environment, and forming, together with the at least one rigid wall of the chamber, a fluid-tight seal to establish a remainder portion of the chamber volume, to exclude the liquid environment from the chamber volume and configured to adjust the chamber volume to at least a first chamber volume and a second chamber volume;
    wherein the chamber volume is configured to establish at least a first buoyancy and a second buoyancy;
    wherein the passively movable compensator is configured to respond to a change in environmental pressure within the liquid environment.

2. The device of claim 1 wherein the chamber and the passively movable compensator are carried within a housing that is configured to be exposed to the liquid environment.

3. The device of claim 2 further comprising:
    a controllable opening having at least a first state and a second state, and forming a second space between the passively movable compensator and the controllable opening; and
    a controller;
    wherein the controllable opening separates the passively movable compensator and the second space from the liquid environment when placed in the second state;
    wherein the first state provides at least a partial opening between the liquid environment and second space, and the second state provides a fluid-tight seal between the liquid environment and second space;
    wherein the controller is configured to change between the at least first and second states of the controllable opening.

4. The device of claim 3 further comprising an external reservoir filled with a fluid and connected to the controllable opening, wherein the fluid is in fluid contact with the passively movable compensator, and the external reservoir forms a seal along with the controllable opening, excluding the liquid environment from the controllable opening.

5. The device of claim 3 having a positive buoyancy force at a first depth in the liquid environment, and a neutral buoyancy force at a second depth in the liquid environment, wherein the controller changes between the first and second states of the controllable opening at the second depth, and maintaining a neutral buoyancy at a third depth in the liquid environment.

6. The device of claim 3 further comprising an external reservoir filled with a fluid and connected to the controllable opening, wherein the fluid is in fluid contact with the passively movable compensator, and the external reservoir forms a seal along with the controllable opening, excluding the liquid environment from the controllable opening.

7. The device of claim 3 further comprising a depth sensor interconnected with the controller, and at least one retaining mechanism located within the chamber volume, wherein the depth sensor provides liquid environment pressure information to the controller and the controller is configured to change the state of the controllable opening based on said liquid environment pressure information and wherein the passively movable compensator is configured to be constrained between a first compensator position and a second compensator position by the at least one retaining mechanism.

8. The device of claim 7 further comprising:
    an attachment mechanism mechanically connected to the housing and informationally connected to the controller;
    wherein the attachment mechanism is configured to reversibly attach to the submersible vehicle; and
    wherein the controller is configured to instruct the attachment mechanism to release from the submersible vehicle.

9. The device of claim 1 further comprising at least one retaining mechanism and a compressible working medium filling the chamber volume, wherein the at least one retaining mechanism is located within the chamber volume, dividing the chamber volume into a fixed section and a variable section, wherein the passively movable compensator is configured to be constrained to the variable section between a first compensator position and a second compensator position by the at least one retaining mechanism.

10. The device of claim 1 wherein the passively movable compensator experiences resistive forces that increases during increased environmental pressure.

11. The device of claim 1 having a positive buoyancy force at a first depth in the liquid environment and a neutral buoyancy force at a second depth in the liquid environment.

12. The device of claim 1 wherein at least the first chamber volume is at a negative pressure.

13. The device of claim 1 wherein the chamber volume is filled with a buoyancy fluid.

14. The device of claim 1 wherein the passively movable compensator experiences compression that increases during increased environmental pressure, and further comprising a biasing member to provide a preselected biasing force during passively movable compensator compression.

15. The device of claim 1 wherein the chamber (i) defines the first chamber volume at a first chamber pressure to establish the first buoyancy when the vehicle is positioned at a first depth having a first environmental pressure in the liquid environment and (ii) establishes the second chamber volume having a second chamber pressure to establish the second buoyancy at a second depth having a second environmental pressure in the liquid environment.

* * * * *